US010346925B2

(12) United States Patent
Perl et al.

(10) Patent No.: US 10,346,925 B2
(45) Date of Patent: Jul. 9, 2019

(54) TELEMATICS SYSTEM WITH VEHICLE EMBEDDED TELEMATICS DEVICES (OEM LINE FITTED) FOR SCORE-DRIVEN, AUTOMATED RISK-TRANSFER AND CORRESPONDING METHOD THEREOF

(71) Applicant: Swiss Reinsurance Company Ltd., Zurich (CH)

(72) Inventors: Andri Perl, Oberhasli (CH); Sebastiaan Bongers, Au (CH); Donato Genovese, Zurich (CH); Hector Naves Sordo, Zurich (CH)

(73) Assignee: Swiss Reinsurance Company Ltd., Zurich (CH)

( * ) Notice: Subject to any disclaimer, the term of this patent is extended or adjusted under 35 U.S.C. 154(b) by 126 days.

(21) Appl. No.: 15/394,260

(22) Filed: Dec. 29, 2016

(65) Prior Publication Data
US 2018/0047107 A1     Feb. 15, 2018

Related U.S. Application Data

(63) Continuation of application No. PCT/EP2016/069297, filed on Aug. 12, 2016.

(51) Int. Cl.
*G06Q 40/08* (2012.01)
*G06N 5/02* (2006.01)
(Continued)

(52) U.S. Cl.
CPC ............... *G06Q 40/08* (2013.01); *G06N 5/02* (2013.01); *G06Q 20/10* (2013.01); *H04M 3/22* (2013.01)

(58) Field of Classification Search
USPC ......... 705/4, 5, 3, 2; 701/469, 31.4; 340/439
See application file for complete search history.

(56) References Cited

U.S. PATENT DOCUMENTS 8,508,353 B2 *  8/2013  Cook ................. G07C 5/085
                                         340/439
8,930,231 B2 *  1/2015  Bowne ............. G06Q 10/0639
                                         705/4
(Continued)

*Primary Examiner* — Tien C Nguyen
(74) *Attorney, Agent, or Firm* — Oblon, McClelland, Maier & Neustadt, L.L.P.

(57) ABSTRACT

Proposed is a OEM-linked, telematics-based system and platform (1) for score-driven operations associated with motor vehicles (41, . . . , 45) or transportation means of passengers or goods and based on a dynamic, telematics-based data aggregation, and method thereof. The telematics-based system (1) comprises vehicle embedded telematics devices (OEM line fitted) (411, . . . , 415) associated with the plurality of motor vehicles (41, . . . , 45), wherein the vehicle embedded telematics devices (OEM line fitted) (411, . . . , 415) comprise a wireless connection (42101-42108) to a central, expert-system based circuit (11). The telematics devices (411, . . . , 415) are connected via interfaces (421, . . . , 425) to the sensors and/or measuring devices (401, . . . , 405) and/or an on-board diagnostic system (431, . . . , 435) and/or an in-car interactive device (441, . . . , 445), wherein the telematics devices (411, . . . , 415) capture usage-based (31) and/or user-based (32) and/or operational (33) telematics data (3) of the motor vehicle (41, . . . , 45) and/or user (321, 322, 323). In response to an emitted shadow request (109) of a central, expert-system based circuit (10) of system (1) associated with a second risk-transfer system, individualized risk-transfer profiles (114) based upon the dynamically generated variable scoring parameters (1011, . . . , 1013) are transmitted from a first risk-transfer systems (11) to the corresponding motor vehicle (41, . . . , 45) and issued by means of a dashboard (461, . . . , 465) of the motor vehicle (41, . . . , 45) for selection by the driver of the motor vehicles (41, . . . , 45). In return of issuing an individualized risk-transfer profile (114) over said dashboard (461, . . . , 465), payment-transfer parameters are transmitted from the (Continued)

first risk-transfer system (11) to the OEM of the OEM-linked, telematics-based system and platform (1).

36 Claims, 5 Drawing Sheets

(51) Int. Cl.
*G06Q 20/10* (2012.01)
*H04M 3/22* (2006.01)

(56) References Cited

U.S. PATENT DOCUMENTS 9,511,778 B1 * 12/2016 Fuentes ................. B60W 40/09
2007/0124332 A1 * 5/2007 Ballesty .............. B61L 27/0094

* cited by examiner

TELEMATICS SYSTEM WITH VEHICLE EMBEDDED TELEMATICS DEVICES (OEM LINE FITTED) FOR SCORE-DRIVEN, AUTOMATED RISK-TRANSFER AND CORRESPONDING METHOD THEREOF

FIELD OF THE INVENTION

The present invention relates to mobile real-time systems reacting dynamically on captured environmental or operational parameters, in particular to telematics system's monitoring, capturing and reacting on automotive parameters of motor vehicles during operation. The present invention further relates to telematics based automated risk-transfer, alert and real-time notification systems for motor vehicles and wireless technology used in the context of telematics. Finally, the invention also relates to telematics-based real-time expert systems. The term telematics, in particular traffic telematics, refers to systems that are used for communications, instrumentation and control, and information technology in the field of transportation. Thus, the present invention relates to the use of telematics together with real-time risk-monitoring, automated risk-transfer and insurance systems based on captured and measured usage-based and/or user-based telematics data.

BACKGROUND OF THE INVENTION

In today's global nature of the automotive industry and the diversity and complexity of modern car construction, it is important for car manufacturers to be able to onboard various suppliers, no matter where they are seated around the World. Many car manufacturers have established a spread manufacturing presence in Eastern Europe, Brazil and China, for example. Furthermore, there are typically numerous, highly specialized third party suppliers delivering parts for the assembly of the complete car. OEM (Original Equipment Manufacturer) denotes the original producer of such a vehicle's component, so OEM car parts are identical to the parts used in the original producing and assembling a vehicle. OEM parts are usually guaranteed by the automaker to be compatible with the vehicle. In contrast to OEM parts aftermarket parts may or may not be compatible, and a broad range of companies may produce aftermarket parts for a certain product. In automotive engineering, automotive design and automobile layout describes, how the car is to be assembled, e.g. where on the vehicle the engine and drive wheels are found, what kind of driving aids are included, as Advanced Driver Assistance Systems (ADAS) and/or corresponding safe Human-Machine Interface to help the driver in the driving process or increase car safety and more generally road safety. Factors influencing the design and assembly layout choice include cost, complexity, reliability, packaging (location and size of the passenger compartment and boot), weight distribution, and the vehicle's intended handling characteristics.

Modern automotive engineered car driving (including completely manually controlled driving, partially autonomous car driving, driverless car, self-driving car, robotic car) is associated with vehicles that are capable of sensing its environment and operational status or use. Such modern automotive engineered vehicles are capable of detecting a great variety of operational or surrounding parameters using e.g. radar, LIDAR (measuring device to measure distances by means of laser light), GPS (Global Positioning System), odometer (measuring device for measuring changings in position over time by means of using motion sensor data), and computer vision. In modern cars, advanced control systems often interpret sensory information to identify appropriate navigation paths, as well as obstacles and relevant signage. The sensors may comprise active and passive sensing devices, wherein sensors are physical converter devices measuring a physical quantity and converting the measured physical quantity it into a signal which can be read by an observer or by another instrument, circuit or system. Common used sensors for automotive motor vehicle or mobile cell phones are e.g. infrared sensors containing an infrared emitter, and an infrared detector, for example used with touchless switches, passive infrared (PIR) sensors reacting and detecting only on ambient IR as for example motion sensors, speed detectors as e.g. radar guns as microwave radars using the Doppler effect (the return echo from a moving object will be frequency shifted) or IR/Laser radars sending pulses of light for determining the difference in reflection time between consecutive pulses to determine speed, ultrasonic sensors emitting a sound and sensing for the echo to determine range, accelerometers measuring the rate of change of the capacitance and translating it into an acceleration by means of a proof mass, gyroscopes measuring a mass oscillating back and forth along the first axis, and plates on either side of the mass in the third direction where the capacitance changes when a rotation is detected around the second direction, IMU-sensors (Inertial Measurement Unit) providing a full 6-degree of freedom sensor by using a combination of accelerometer and gyroscope, force sensing resistor e.g. for contact sensing, touchscreens based on resistive, capacitive or surface acoustic wave sensing, location sensors as GPS (Global Positioning System), triangulation or cell identification systems, visual sensors as cameras and computer visions, SIM-based or RFID-based (Radio-Frequency Identification) sensors, or environment sensors as moisture sensors, humidity sensors, temperature sensors etc. Said vehicles' capabilities for sensing its environment and operational status or use, is e.g. used in the above-mentioned advanced driver assistance systems (ADAS) which denotes systems developed to automate/adapt/enhance vehicle systems for safety and better driving. Safety features are designed to avoid collisions and accidents by offering technologies that alert the driver to potential problems, or to avoid collisions by implementing safeguards and taking over control of the vehicle. Adaptive features may automate lighting, provide adaptive cruise control, automate braking, incorporate GPS/traffic warnings, connect to smartphones, alert driver to other cars or dangers, keep the driver in the correct lane, or show what is in blind spots.

Different forms of ADAS exist in the prior art, wherein some of the features are built into cars or are available as an add-on package. Often, there are also aftermarket solutions provided by third party suppliers. ADAS relies on inputs from multiple data sources, including the above-described automotive imaging, LiDAR, radar, image processing, computer vision, and in-car networking. Further, also inputs are possible from other sources separate from the primary vehicle platform, such as other vehicles, referred to as Vehicle-to-vehicle (V2V), or Vehicle-to-Infrastructure (e.g. mobile telephony or Wi-Fi data network) systems. In the recent years, the ADAS technology are one of the fastest developing fields in automotive electronics, with increasing rates of adoption of industry-wide quality standards, in vehicular safety systems (cf. e.g. ISO 26262 of the International Organization for Standardization (ISO)) developing technology specific standards, such as IEEE 2020 for Image Sensor quality or communications protocols such as the Vehicle Information API (Application Programming Interface). ADAS is clearly pushing the development of wireless network connectivity to offer improved value by using car-to-car (also referred as Vehicle to Vehicle (V2V)) and car-to-infrastructure (also referred as Vehicle to Infrastructure (V2X)) data.

The above outlined development of device and user monitoring, typically referred as telematics, strongly influenced and still influencing the electronic, telecommunication added value services and risk-transfer (insurance) industry developing similar or consistent technical strategies to improve the effectiveness of interactions and the immediacy (real-time) interaction with customers. The needed components are today increasingly pure technology components. Social networking, telematics, service-oriented architectures (SCA) and usage-based services (UBS) are all in interacting and pushing this development. Social platforms, as e.g. Facebook, Twitter and YouTube, offer the ability to improve customer interactions and communicate product information. However, the field of telematics is larger still, as it introduces entirely new possibilities that align the technical input requirements and problem specifications of dynamic risk-transfer, technology and mobility. SOA and telematics is becoming key to managing the complexity of integrating known technologies and new applications. Technically, telematics being a composite of telecommunication and information technology, is an interdisciplinary technical term encompassing telecommunications, vehicular technologies, road transportation, road safety, electrical engineering (sensors, instrumentation, wireless communications, etc.), and information technology (multimedia, Internet, etc.). Thus, the technical field of mobile parameters sensing, data aggregation or telematics are affected by a wide range of technologies as the technology of sending, receiving and storing information via telecommunication devices in conjunction with affecting control on remote objects, the integrated use of telecommunications and informatics for application in vehicles and e.g. with control of vehicles on the move, GNSS (Global Navigation Satellite System) technology integrated with computers and mobile communications technology in automotive navigation systems. The use of such technology together with road vehicles is also called vehicle telematics. In particular, telematics triggers the integration of mobile communications, vehicle monitoring systems and location technology by allowing a new way of capturing and monitoring real-time data. Usage-based risk-transfer systems, as e.g. provided by the so called Snapshot technology of the firm Progressive, link risk-transfer compensation or premiums to monitored driving behavior and usage information gathered by an in-car "telematics" device. In the past five years, telematics devices show expanded use by a factor 10 to 100 in cars. On such a broadened platform, telematics devices and systems may help to increase safety and improve driving behavior.

Vehicle telematics refers to installing or embedding telecommunications devices mostly in mobile units, as e.g. cars or other vehicles, to transmit real-time driving data, which for example can be used by third parties' system, as automated risk-monitoring and risk-transfer systems, providing the needed input e.g. to measure the quality and risks of individual drivers. The telematics instruments for such changes are available in the market. Vehicle tracking and global positioning satellite system (GPS) technologies are becoming commonplace, as are the telecommunications devices that allow us to be connected from almost anywhere. In particular, dynamically monitored and adapted risk-transfer could be imaginable by interconnecting telematics with other real-time measuring systems. There are various satellite navigation systems for vehicle tracking with local or global coverage, which are termed global navigation satellite system (GNSS). Examples are NAVSTAR Global Positioning System (GPS) (United States), GLONASS (Russian), BeiDou Navigation Satellite System (China), Galileo (European Union), and the GPS Aided GEO Augmented Navigation (GAGAN) (India), which enhances the accuracy of NAVSTAR GPS and GLONASS positions or the Quasi-Zenith Satellite System (QZSS) (Japan), which is a three-satellite regional time transfer system and enhancement for GPS. Advantages provided by such systems could e.g. comprise, that after getting involved into a car accident, emergency and road services could be automatically activated, vehicle damage assessed, and the nearest repair shop contacted. In summary, the customer experience could be transformed beyond traditional operatablility of risk-transfer systems and insurance coverage to real-time navigation and monitoring, including the automated activation of concierge service, safe driving tips, video-on-demand for the kids in the backseat, in-car or online feedback, and real-time vehicle diagnostics.

In addition to real-time surveillance, it is to be mentioned, that an insurance agent may want to exchange information with a customer associated with insurer for a number of different reasons. However, the information exchange between the customer and the insurer and/or the insurer and the reinsurer mostly is still cumbersome and time-consuming, and thus, risk-transfers provided by such structures typically remain static within a fixed time period agreed upon. For example, an existing or potential consumer may access an insurance agent's web page to determine a yearly or monthly cost of an insurance policy (e.g. hoping to save money or increase a level of protection by selecting a new insurance company). The consumer may provide basic information to the insurance agent (e.g. name, a type of business, date of birth, occupation, etc.), and the insurance agent may use this information to request a premium quote from the insurer. In some cases, the insurer will simply respond to the insurance agent with a premium quote. In other cases, however, an underwriter associated with insurer will ask the insurance agent to provide additional information so that an appropriate premium quote can be generated. For example, an underwriter might ask the insurance agent to indicate how often, where and to which time a motor vehicle is mainly used or other data as age of the motor vehicle and indented use (transportation etc.). Only after such additional information is determined, an appropriate risk analysis can be performed by the insurer to process adapted underwriting decision, and/or premium pricing.

Integrated telematics technologies may offer new technological fields, in particular in monitoring and steering by means of centralized expert systems, as e.g. in the risk-transfer technology far more accurate and profitable pricing models provided by such automated expert systems. This would create a huge advantage, in particular for real-time and/or usage-based and/or dynamically operated systems. The advantage of such telematics systems is not restricted to risk transfer rather as also advantages e.g. in fleets' management that monitor employees' driving behavior via telematics improving asset utilization, reduce fuel consumption and improve safety etc. etc. Other fields may also benefit from such integrated telematics systems, as state and local governments needs striving to improve fuel consumption, emissions and highway safety. Some states, for example, recently issued dynamic pay-as-you-drive (PAYD) regulations, which on the other side allows insurers to offer drivers insurance rates based on actual versus estimated miles driven. It's a financial incentive to drive less.

Already now, the telematics technology provides the above-mentioned features as an accelerometer allowing to assess drivers' style and behavior, thus expanding the risk factors normally tracked from the current 40 to more than 100. As demand for accelerometers has increased, automakers and device manufacturers have been able to push down the unit cost. The need for increased connectivity and access (driven by the "always-connected" consumer) will allow additional device applications. It is to be pointed out that most technologies in the telematics ecosystem are not unique to vehicle's insurance. Social listening, neighborhood protection portals and home monitoring have an impact on how home and property insurance risks are assessed. Further, monitoring systems are available to adjust home temperature controls or automatically dispatch service providers should there be a water, heat or air-conditioning issue in a home. Also, telematics technologies are being developed for healthcare and senior living products, including location-based alerts, health-monitoring, and family-tracking services that may be used for how individual risk is assessed, allowing optimized risk-transfer in the life risk-transfer field. Examples are also robotic nurse's aide designed to remind the elderly about routine activities, also guides them through their homes and calls for help in case of emergencies. These sorts of applications will continue to evolve as technology becomes more reliable and cost effective and as the need for such solutions increases in the elderly and home-care sectors.

Telematics technology, as used in the way of the present invention, may also provide the basis technology for Service-oriented architectures (SOAs) or usage-based and/or user-based applications. Both are considered among the most promising of today's technologies. SOAs allow companies to make their applications and computing resources (such as customer databases and supplier catalogs) available on an as-needed basis, either via an intranet or the Internet. Based on a plug-and-play concept, SOA provides reusable software components across multiple technology platforms. It offers a new approach to software deployment while also tackling serious problems, such as complexity and ineffective data integration. This approach provides a consistent technology making it easier to access data and to integrate both new and old content. Information and services are centralized and reusable, shortening development times and reducing maintenance costs. When a software service is needed (such as retrieving customer information) the user or system sends a request to a directory, which determines the proper service name, location and required format, and then sends back the desired output (in this case, customer information). Users and other applications do not need to know the internal workings of the data handling or processing. Nor do organizations need to own and maintain software; they just access the appropriate service over the Internet or network, or another data transmission network. However, telematics technology, as used in the way of the present invention, may also provide the basis technology for other platforms, as e.g. IoT-platforms (Internet of Things), which provide the network of physical devices, vehicles, buildings and/or other items embedded with electronics, software sensors, actuators, and network connectivity that enables these objects to collect and exchange data. In particular, IoT allows objects to be sensed and controlled remotely across existing network infrastructure, also allowing for a more direct integration of the physical world into processor-driven systems and computer means. This integration results in improved efficiency, accuracy and economic benefit. When IoT comprises sensors and actuators, the technology becomes a more general system-class of cyber-physical systems, which may encompass technologies as smart grids, smart homes, intelligent transportations, and smart cities. In IoT, each thing is uniquely identifiable through its embedded computer system, and is also able to interoperate with the existing Internet infrastructure. IoT provides advanced connectivity of devices, systems, and services that goes beyond machine-to-machine (M2M) communications and covers a variety of protocols, domains and applications. There are incorporated herein by reference. The interconnection of these embedded devices (including smart objects), is applicable in automation in nearly all fields, while also enabling advanced applications like a smart grid, and smart cities. Things in IoT refer to a wide variety of devices but in particular to automobiles with built-in sensors, analysis devices for environmental monitoring or field operation devices that can assist car drivers e.g. in search and rescue operations. Thus, things in IoT can comprise a mixture of hardware, software, data and/or service. Such devices collect useful data with the help of various existing technologies and then autonomously flow the data between other devices. Current examples include the numerous prototype autonomous or half-autonomous vehicles currently developed, including Mercedes-Benz, General Motors, Continental Automotive Systems, IAV, Autoliv Inc., Bosch, Nissan, Renault, Toyota, Audi, Volvo, Tesla Motors, Peugeot, AKKA Technologies, Vislab from University of Parma, Oxford University and Google, for example, using interconnected telematics devices with appropriate network technology for control, monitoring, operating and steering of the half or fully automated vehicles.

SUMMARY OF THE INVENTION

It is one object of the present invention to provide a mobile automotive systems reacting, in real-time, dynamically on captured environmental or operational parameters of motor vehicles during operation, in particular on measuring parameters of automotive systems, allowing a user to dynamically and in real-time adapt vehicle's operation or driving risks by means of an automated risk-transfer engine allowing to dynamically select appropriate risk-transfer profiles based on monitoring, capturing and reacting on automotive parameters of motor vehicles during operation. Further, it is an object of the invention to dynamically triggered, automated, telematics-based automotive systems based on real-time capturing of vehicle telematics data. In particular, it is an object of the present invention to extend the existing technology to a dynamic triggered and dynamically adjustable, multi-tier risk-transfer system based on a dynamic adaptable or even floating first-tier level risk-transfer, thereby reinforcing the importance of developing automated systems allowing self-sufficient, real-time reacting operation. Another object of the invention seeks to provide a way to technically capture, handle and automate dynamically adaptable, complex and difficult to compare risk transfer structures by the user and trigger operations that are related to automate optimally shared risks and transfer operations. Another object of the invention seeks to dynamically synchronize and adjust such operations to changing environmental or operational conditions by means of telematics data invasive, harmonized use of telematics between the different risk-transfer systems based on an appropriate technical trigger structure approach, thus making the different risk-transfer approaches comparable. In contrast to standard practice, the resource pooling systems of the different risk-transfer system shall create a comparable risk-transfer structure, allowing to optimize risk-transfer operation with the desired, technically based, repetitious accuracy that relies on technical means, process flow and process control/operation. Along the automated insurance telematics value chain, there are many technologies offering individual elements, however, it is an object of the present invention to provide a holistic technical solution that covers the whole range from device installation and data capturing to the automated and accurate risk measuring, analysis and management. Finally, it is a further object of the invention to provide a dynamic, expert scoring system based on real-time scoring and measurements, and further to provide a technically scalable solution based on scoring algorithms and data processing allowing to adapt and compare the signaling to other field of automated risk-transfer. In particular, real-time scoring and measurements with feedback provided to the car/driver based on the real-time scoring, e.g. to warn the driver about risky behaviors and to optimize the risk-transfer.

According to the present invention, these objects are achieved, particularly, with the features of the independent claims. In addition, further advantageous embodiments can be derived from the dependent claims and the related descriptions.

According to the present invention, the above-mentioned objects for an OEM-linked, telematics-based system and platform for score-driven operations associated with motor vehicles or transportation means of passengers or goods, are achieved, particularly, in that, by means of the present invention, the telematics-based system comprises vehicle embedded telematics devices (OEM line fitted) associated with the plurality of motor vehicles, the OEM-assembled telematics devices comprising one or more wireless connections or wired connections a plurality of interfaces for connection with at least one of a vehicle's data transmission bus, and/or a plurality of interfaces for connection with sensors and/or measuring devices, wherein, for providing the wireless connection, the telematics device acts as wireless node within a corresponding data transmission network by means of antenna connections of the telematics device and wherein the telematics devices are connected via the interfaces to the sensors and/or measuring devices and/or an on-board diagnostic system and/or an in-car interactive device, and wherein the telematics devices capture usage-based and/or user-based and/or operational telematics data of the motor vehicle and/or user, in that the telematics-based, OEM-linked system comprises one or more first risk-transfer systems to provide a first risk-transfer based on first risk transfer parameters from at least some of the motor vehicles to one of the first risk-transfer systems, wherein the first risk-transfer systems comprise a plurality of payment transfer modules configured to receive and store first payment parameters associated with risk-transfer of risk exposures of said motor vehicles for pooling of their risks, and that the automated and telematics-based OEM-system comprises a second risk-transfer system to provide a second risk-transfer based on second risk-transfer parameters from one or more of the first risk-transfer systems to the second risk-transfer system, wherein the second risk-transfer system comprises second payment transfer modules configured to receive and store second payment parameters for pooling of the risks of the first risk-transfer systems associated with risk exposures transferred to the first risk-transfer systems, in that the plurality of vehicle embedded telematics devices (OEM line fitted) of the motor vehicles are connected via said data transmission network to a central, expert-system based circuit associated with the second risk-transfer system, wherein a data link is set by means of the wireless connection between the central, expert-system based circuit transmitting at least the captured usage-based and/or user-based and/or operational telematics data from the vehicle embedded telematics devices (OEM line fitted) to the central, expert-system based circuit, in that by means of a vehicle-telematics driven aggregator of the central, expert-system based circuit associated with the second risk-transfer system risk-related usage-based and/or user-based and/or operational telematics data captured from the OEM-assembled mobile telematics are triggered and monitored by means of telematics data-based triggers in the dataflow pathway of the vehicle embedded telematics devices (OEM line fitted), in that the central, expert-system based circuit associated with the second risk-transfer system further comprises a driving score module measuring and/or generating a single or a compound set of variable scoring parameters profiling the use and/or style and/or environmental condition of driving during operation of the motor vehicle based upon the captured, triggered and monitored risk-related usage-based and/or user-based and/or operational telematics data, in that by means of the central, expert-system based circuit associated with the second risk-transfer system a shadow request is transmitted to at least one of the first risk-transfer systems decentrally connected to the central, expert-system based circuit over a data transmission network, wherein the shadow request comprises at least said single or a compound set of variable scoring parameters and/or risk-relevant parameters based upon the captured, triggered and monitored risk-related usage-based and/or user-based and/or operational telematics data, and in that in response to the emitted shadow request individualized risk-transfer profiles based upon the dynamically collected single or compound set of variable scoring parameters are transmitted from at least one first risk-transfer systems to a corresponding motor vehicle and issued by means of a dashboard of the motor vehicle for selection by the driver of the motor vehicles, and that in return of issuing an individualized risk-transfer profile over said dashboard, payment-transfer parameters are transmitted from the first risk-transfer system to the OEM of the vehicle-linked, telematics-based system and platform. The single or compound set of variable scoring parameters profiling the use and/or style and/or environmental condition of driving during operation of the motor vehicle and generated by means of the driving score module can at least comprise e.g. scoring parameters measuring a driving score and/or a contextual score and/or a vehicle safety score. The variable driving scoring parameter can e.g. at least be based upon a measure of driver behavior parameters comprising speed and/or acceleration and/or braking and/or cornering and/or jerking, and/or a measure of distraction parameters comprising mobile phone usage while driving and/or a measure of fatigue parameters and/or drug use parameters. The variable contextual scoring parameter can e.g. at least be based upon measured trip score parameters based on road type and/or number of intersection and/or tunnels and/or elevation, and/or measured time of travel parameters, and/or measured weather parameters and/or measured location parameters, and/or measured distance driven parameters. The variable vehicle safety scoring parameter can e.g. at least be based upon measured ADAS feature activation parameters and/or measured vehicle crash test rating parameters and/or measured level of automation parameters of the motor vehicle and/or measured software risk scores parameters. The plurality of individualized risk-transfer profiles provided by the automated risk-transfer supplier systems can e.g. time-dependently vary based on the measured time-dependent use and/or style and/or environmental condition of driving by means of the triggered, captured, and monitored operating parameters or environmental parameters during operation of the motor vehicle. The automated risk-transfer supplier systems can comprise associated automated first risk-transfer systems to provide a first risk-transfer based on first risk transfer parameters from the motor vehicle to the respective first risk-transfer system, wherein the first risk-transfer system comprises a plurality of payment transfer modules configured to receive and store first payment parameters associated with risk-transfer of risk exposures of said motor vehicles for pooling of their risks. The risk-relevant parameters of the shadow request can e.g. at least comprise parts of the generated single or set compound of variable scoring parameters and/or at least parts of the usage-based and/or user-based and/or operating telematics data captured by means of the vehicle embedded telematics devices (OEM line fitted). The one or more wireless connections or wired connections of the vehicle embedded telematics devices (OEM line fitted) can e.g. comprise Bluetooth or Bluetooth LE and/or Wi-Fi and/or WiMAX and/or laser-based high-speed wireless connection, for example using a light-bulb-shaped detector with orthagonal frequency-division multiplexing, as wireless connection for exchanging data using short-wavelength UHF (Ultra high frequency) radio waves in the ISM (industrial, scientific and medical) radio band from 2.4 to 2.485 GHz by building a personal area networks (PAN) with the on-board Bluetooth capabilities or Bluetooth LE (Low Energy) and/or 3G or 4G and/or GPS and/or GPRS and/or BT based on Wi-Fi 802.11 standard and/or WiMAX, and/or a contactless or contact smart card, and/or a SD card (Secure Digital Memory Card) or another interchangeable non-volatile memory card.

As an embodiment variant, the on-board sensors and measuring devices and/or vehicle embedded telematics devices (OEM line fitted) and/or on-board diagnostic system and/or in-car interactive device can e.g. comprise proprioceptive sensors and/or measuring devices for sensing the operating parameters of the motor vehicle and/or exteroceptive sensors and/or measuring devices for sensing the environmental parameters during operation of the motor vehicle. The on-board sensors and measuring devices can e.g. comprise at least a GPS module (Global Positioning System) and/or geological compass module based on a 3-axis teslameter and a 3-axis accelerometer, and/or gyrosensor or gyrometer, and/or a M EMS accelerometer sensor comprising a consisting of a cantilever beam with the seismic mass as a proof mass measuring the proper or g-force acceleration, and/or a MEMS magnetometer or a magnetoresistive permalloy sensor or another three-axis magnetometers. The defined risk events associated with transferred risk exposure of the motor vehicles can, for example, at least comprise transferred risk exposure related to liability risk-transfers for damages and/or losses and/or delay in delivery, wherein the occurred loss is automatically covered by the first risk-transfer system based on the first risk transfer parameters and correlated first payment transfer parameters (if a requested risk-transfer is not rejected by the system at this time). The exteroceptive sensors or measuring devices can, for example, comprise at least radar devices for monitoring surrounding of the motor vehicle and/or LIDAR devices for monitoring surrounding of the motor vehicle and/or global positioning systems or vehicle tracking devices for measuring positioning parameters of the motor vehicle and/or odometrical devices for complementing and improving the positioning parameters measured by the global positioning systems or vehicle tracking devices and/or computer vision devices or video cameras for monitoring the surrounding of the motor vehicle and/or ultrasonic sensors for measuring the position of objects close to the motor vehicle. For providing the wireless connection, the mobile telecommunication apparatus can e.g. act as wireless node within a corresponding data transmission network by means of antenna connections of the vehicle embedded telematics devices (OEM line fitted), in particular mobile telecommunication networks as e.g. 3G, 4G, 5G LTE (Long-Term Evolution) networks or mobile WiMAX or other GSM/EDGE and UMTS/HSPA based network technologies etc., and more particular with appropriate identification means as SIM (Subscriber Identity Module) etc. The vehicle embedded telematics devices (OEM line fitted) can e.g. be connected to an on-board diagnostic system and/or an in-car interactive device, wherein the vehicle embedded telematics devices (OEM line fitted) capture usage-based and/or user-based and/or operational telematics data of the motor vehicle and/or user. Further, the vehicle embedded telematics devices (OEM line fitted) can e.g. be connected to an in-car interactive device and/or on-board diagnostic system, wherein the vehicle's speed and travel distances is monitored by a global positioning system (GPS) circuit and wherein the telematics data are transmitted via the vehicle embedded telematics devices (OEM line fitted) to the central, expert-system based circuit by means of a cellular telecommunication connection. The vehicle embedded telematics devices (OEM line fitted) can e.g. provide the one or more wireless connections by means radio data systems (RDS) modules and/or positioning system including a satellite receiving module and/or a mobile cellular phone module including a digital radio service module and/or a language unit in communication the radio data system or the positioning system or the cellular telephone module. The satellite receiving module can e.g. comprise a Global Positioning System (GPS) circuit and/or the digital radio service module comprises at least a Global System for Mobile Communications (GSM) unit. The plurality of interfaces of the mobile telecommunication apparatus for connection with at least one of a motor vehicle's data transmission bus can e.g. comprise at least on interface for connection with a motor vehicle's Controller Area Network (CAN) bus, e.g. in connection with on-board diagnostics (OBD) port, or other connection e.g. for battery installed devices, or also OEM (Original Equipment Manufacturer) installed systems getting information access to on-board sensors or entertainment systems (as e.g. Apple Carplay etc.) providing the necessary vehicle sensor information. The central, expert-system based circuit can further comprise an aggregation module providing the risk exposure for one or a plurality of the pooled risk exposed motor vehicles based on the captured risk-related telematics data, wherein the first and second risk transfer parameters and the correlated first and second payment transfer parameters are dynamically generated based on the likelihood of the occurrence of the predefined risk events of the pooled motor vehicles. In addition, the occurred and triggered losses can be automatically aggregated by means of captured loss parameters of the measured occurrence of risk events over all risk exposed motor vehicles within a predefined time period by incrementing an associated stored aggregated loss parameter and for automatically aggregating the received and stored first payment parameters over all risk exposed vehicles within the predefined time period by incrementing an associated stored, aggregated payment parameter, and wherein the variable first and second risk transfer parameters and the correlated first and second payment transfer parameters dynamically are generated based upon the ratio of the aggregated loss parameter and the aggregated payment parameter. The first and second risk-transfer system can e.g. be fully automated steered, triggered, signaled, and mutually activated by means of the central, expert-system based circuit, wherein the steering, triggering, signaling and activating is based on the dynamic-adaptable first and second risk transfer parameters and the correlated first and second payment transfer parameters, providing a self-sufficient risk protection for the variable number of motor vehicles associated with the OEM-linked, telematics-based system and platform by means of the coupled first and second insurance system. In the context of the first- and second risk-transfer tier, the first risk-transfer system can e.g. comprise an automated first resource pooling system and the second risk-transfer system comprises a automated second resource pooling system, wherein the risk exposed motor vehicles are connected to the first resource pooling system by means of a plurality of payment transfer modules configured to receive and store first payments from the risk exposed motor vehicles for the pooling of their risk exposures, wherein the first risk-transfer system provides automated risk protection for each of the connected risk exposed motor vehicles based on received and stored first payment parameters, wherein the first risk-transfer system is connected to the second resource pooling system by means of second payment transfer modules configured to receive and store second payment parameters from the first insurance system for adopting of a portion of the risk exposures accumulated by the first risk-transfer system, and wherein, in the case of the occurrence of one of defined risk events the occurred loss is automatically covered by the expert-system based automotive car system.

One of the advantages of the present system is to provide a technical and comprehensive solution that scores individual drivers based on telematics data, in particular data sourced from CAN BUS or TCU (Telematics Control Unit) or through the car manufacturers or mapping providers' data cloud. This has the advantage to access new data points which cannot be accessed through black box, OBD or other telematics devices. This approach further bridges the main contributor factors for accidents to risk factors to telematics data points for scoring purposes in order to have a precise risk assessment. As an example may serve the USA, where the Nr 2 accident cause is speeding. The present innovation makes it possible to take into account the speeding and other data points as e.g., NAVI (Automotive Navigation System) vehicle speed information, vehicle speed at brake operation (trip data), or e.g. the braking information can be coupled with the activation of ADAS systems such as ABS (Anti-lock braking system) or ESC (Electronic Stability Control) during a driving event (instead of G forces). Based on the score and other relevant telematics data visible to consumers and insurers (if consumer agrees), insurers are able quote. The present invention allows a complete new way for automated risk-transfer for motor vehicles, wherein the second risk-transfer system (reinsurer) is able to provide and distribute risk-transfers (insurance) through car manufacturers and OEMs of the motor vehicles, respectively. The present system is completely flexible with regard to the risk-exposed motor vehicle or the insured. For example, the present system may provide a 1 or 2 months' free risk-transfer or a trial period for a motor vehicle and/or consumer. Afterwards, the consumer can select an insurance provider based on these quotes. Based on its flexibility, the applicability of the present invention is not restricted to risk-transfer in the context of motor vehicle, but can also be applied to other fields of risk-transfer. The invention allows providing an automated and telematics-based risk-transfer platform (that allows almost fully automated risk-transfer, incl. policy issuing, claims handling etc.), potentially offered via a OEM provider. OEM/car manufacturers can act as distributor of the risk-transfers (insurances) through embedded devices e.g. infotainment system (and potentially smart phone application). As mentioned, the second risk-transfer system and/or its associated first risk-transfer system may offer a free trial period (e.g. 1-2 months) to potential customers (potential policyholder), creating advantages for all parties. Thus, the invention allows to enable features as TBYB (Try Before You Buy) features, which is not possible for competing risk-transfers by prior art systems. Second risk-transfer systems are able to analyze telematics data from the vehicles (embedded device) to provide a scoring of the driving style and data then transferred to associated first insurance systems which can give a quote based on the score obtained. Thus, also the second risk-transfer system is able to optimize its operational risk-transfer parameters. The central, expert-system based circuit scores and provides issuing of quote through dashboard/car's touchscreen. The inventive system and platform provides end customer the choice to freely select a risk-transfer provider and product (e.g. PHYD (Pay how you Drive) or PAYD (Pay as you Drive)) based on these quotes. In PHYD, the risk-transfer systems may e.g. discount based on the personal driving behavior (how a person breaks, accelerates, turns). The discounts are based on telematics devices installed in the motor vehicle and the corresponding captured telematics data that measure behavior and location over time. In PAYD, the risk-transfer systems may e.g. discount based on mileage (how much a person drives) and not where or how. The can e.g. be based on odometer readings captured via the vehicle embedded telematics devices (OEM line fitted), aggregated GPS data if such a device is installed, or odometer readings from other telematics devices installed in the car. The vehicle-linked, telematics-based system and platform with vehicle embedded telematics devices (OEM line fitted) allows to provide added value services to motor vehicles/policyholders, both risk-transfer and/or other services. The present inventive system allows to provide its core functionality through the dashboard/infotainment system/car's touchscreen of the motor vehicle. It is a fully automated system for providing driver rating/scoring/behavior comparison, issuing of quote through dashboard (aggregator module/quotation by various first risk-transfer systems (insurances) and comparison), trial period, policy information (billing, claims, policy information)/data exchange with digital platform/claims handling (potentially up to a threshold). The invention can also be realized, for example, by an optional link to smartphone app (from OEM or car manufacturers) or embedded app in above devices. The OEM may realize the vehicle embedded telematics devices (OEM line fitted) to maintain smartphone projection standards to allow mobile devices running a certain operating system to be operated in automobiles through the dashboard's head unit. Examples may include Apple Carplay, Mirrorlink, Android Auto, on-board navigation systems. For the vehicle embedded telematics devices (OEM line fitted) there may also exist other device sources, as e.g. aftermarket and retrofitted devices (windscreen device, black box, OBD dongle, CLA device (cigarette lighter adaptor), eCall OBU, navigation system) as standalone or with link to smartphone app or internet webpage or smart watch and other wearables. The invention is not restricted to any connection standard. It may be used, for example, based on NB-IOT and/or Wi-Fi and/or Bluetooth and/or cellular and/or ultra-narrow band (UNB) and/or a Low Power Wide Area (LPWA) (internet). Finally, the present invention allows to implement added features or services, such as automated policy module, incl. automated underwriting, claims handling module, technical accounting module (e.g. for monthly billing), client management modules, and/or additional telematics modules as driver feedback, positive selection, reward, loyalty program, engagement, gamification, social media integration, interface for added value services (e.g. e-call, crash notification, crash reporting etc.), etc. Further value added services may be integrated in the present inventive system and technically automated, as e.g. stolen vehicle recovery, stolen vehicle tracking, post-accident services, crash reporting, driver coaching/training, eCall/bCall, reward, real-time feedback, driver scoring, driver safety training, real time traffic information, remote diagnostics, fuel consumption, location and prices of gas stations, POI service, social networking, scheduling and dispatch Geo-fencing, repair costs calculation, fleet management and tracking, ridesharing functionality (autonomous vehicles) or car sharing reservations, and/or "last mile" feature (if the car is parked).

Further, the present invention provides a completely transparent application of complex risk-transfer assessments, where vehicle embedded telematics devices (OEM line fitted) dynamically collect data when people drive. Users can easily use the inventive system by means of the dashboard of the motor vehicle. The present invention allows to provide a system, which is not linked to risk-transfer systems or associated insurance companies. The present invention does not have to be restricted to interaction via OEM telematics and OEM dashboard but could also be an aftermarket telematics device or an OEM embedded device. Aftermarket devices can comprise (e.g., Windscreen device, Black box, OBD dongle, CLA device (cigarette lighter adaptor), eCall OBU, navigation system) as stand-alone or with link to the inventive cellular phone node application. As variant, smartphone projection standards may allow mobile devices running a certain operating system to be operated in automobiles through the dashboard's head unit. Examples include Apple Carplay, Mirrorlink, Android Auto, Onboard navigation systems. Other aggregator devices can allow e.g. be an embedded OEM device and/or infotainment system and/or dashboard's head unit and/or car's touchscreen (e.g. in cars like Tesla) etc. The data can e.g. be analyzed by a third party to provide a scoring of the driving style and then transferred to primary insurer partners which can give a quote based on the score obtained. It may include other relevant data that insurers can use to differentiate and steer their portfolio. Thus, the inventive system allows provider/aggregator/OME to bring new telematics consumers to insurers, where the consumers can dynamically select an insurance provider based on these quotes. The telematics-vehicle data allow to dynamically capture a vast number of risk-factors, in addition to risk-factors, as considered by prior art systems. Such risk factor can e.g. comprise time-dependent speed measuring, hard breaking, acceleration, cornering, distance, mileage (PAYD), short journey, time of day, road and terrain type, mobile phone usage (while driving), weather/driving conditions, location, temperature, blind spot, local driving, sun angle and dazzling sun information (sun shining in drivers' face), seatbelt status, rush hour, fatigue, driver confidence, throttle position, lane changing, fuel consumption, VIN (vehicle identification number), slalom, excessive RPM (Revolutions Per Minute), off road, G forces, brake pedal position, driver alertness, CAN (Controller Area Network) bus (vehicle's bus) parameters including fuel level, distance to other vehicles, distance to obstacles, driver alertness, activated/usage of automated features, activated/usage of Advanced Driver Assistance Systems, traction control data, usage of headlights and other lights, usage of blinkers, vehicle weight, amount of vehicle passengers, traffic sign information, junctions crossed, jumping of orange and red traffic lights, alcohol level detection devices, drug detection devices, driver distraction sensors, driver aggressiveness, driver mental and emotional condition, dazzling headlights from other vehicles, vehicle door status (open/closed), visibility through windscreens, lane position, lane choice, vehicle safety, driver mood, and/or passengers' mood. Up-to-now, no prior art system is able to process such a variety of dynamic-monitored, risk-relevant data. The advantage of the generated score parameters mirrors the captured sensory data in that the data components of the score can even e.g. comprise: customer policy details, individual driving data, crash forensics data, credit scores, statistical driving data, historic claims data, market databases, driving license points, statistical claims data, context data of weather or road type or surrounding. This broad monitoring capability further allows for providing a technical solution of optimized coupling two automated risk-transfer systems with a better and more effective technical implementations, thereby enabling to share and minimize the needed automotive resources and to provide a unified, optimized multi-tier risk-transfer approach by sharing expert and development means for generating minimized conditions for the necessarily required resource-pooling (e.g. pooled premiums). The present invention provides a holistic technical solution that covers the whole range of risk-transfer structures from collecting sensor and ADAS (advanced driver assistance systems, or active safety) data to accurate risk analysis for automated risk-transfer systems/coverage and value added services (e.g., car sharing solutions, fleet management, alerts, cross-selling, consultancy), which is not possible with the prior art systems. The present invention provides an automated risk-transfer system for all kinds of risk-transfer schemes, as e.g. motor or product liability (re-)insurance systems and/or risk-transfer systems related to or depending on partially or fully automated vehicles. Also, the present invention provides a holistic and unified, automated technical approach for coverage to the motor vehicles in all different structures of risk-transfer, as e.g. product liability for car and/or technology manufacturer, driver liability cover. Further, the present invention also provides a holistic technical solution that covers the whole range from automotive control circuits and/or telematics devices and/or app installations to the automated and accurate risk measuring, analysis and management. Finally, it is able to provide a dynamic, expert-system based or machine learning-based scoring system based on real-time scoring and measurements, and further provides a technically scalable solution based on scoring algorithms and data processing allowing to adapt the signaling to other fields of automated risk-transfer. The present invention, which is enhanced by contextual data, is able to provide best and highest optimized technical solution to the real-time adapted multi-tier risk-transfer system. It allows to capture and control the driver score behavior, and compare its behavior within the technical operation and context. It allows to automatically capture risk's scores according to location or trip, and to automatically analyze and react on data related to the need of value added services, as e.g. accident notifications and/or feedback to the driver and/or automated fleet risk reporting and/or automated and dynamically optimized underwriting etc.). As embodiment variant, the score driving module can e.g. automatically capture scores risks according to a measured maintenance (e.g. maintenance failure by owner) and surveillance factor extracted from the automotive data associated with the motor vehicle or the use of active safety features. The telematics based feedback means of the system may e.g. comprise a dynamic alert feed via a data link to the motor vehicle's automotive control circuit, wherein the central, expert-system based circuit heads up device alerts drivers immediately to a number of performance measures including e.g. high RPM, i.e. high revolutions per minute as a measure of the frequency of the motor rotation of the motor vehicle's engine, unsteady drive, unnecessary engine power, harsh acceleration, road anticipation, and/or ECO drive. The telematics-based, OEM-linked system provides the opportunities for risk-adaption and improvement dynamically and in real-time, i.e. as and when they happen, related to the motor vehicle's risk patterns (e.g. location, speed, etc.). Providing instant feedback to drivers through heads up training aids and get information sent straight to the mobile telematics device, ensures a two pronged approach to correcting risky (and often expensive) driving habits. Thus, the automotive car system not only allows to mutually optimize the operational parameters of the first and second risk transfer system, but also optimize the risk and/or risk behavior on the level of the risk exposed motor vehicles. No prior art system allows such an integral, real-time optimization. As another value added service, the automotive car system can e.g. dynamically generated fleet risk reports of selected motor vehicles. Such fleet reports, automatically generated by the automotive car system, provide a new approach to share and compare vehicles' statistics. The proposed invention with e.g. prefunding automotive enabled risk-transfer ((re)insurance) means will stimulate the carriers (first-tier risk-transfer systems) to provide its automotive data and claims' histories to the second-tier risk-transfer system in order to continually improve its scoring service, which in turn benefits carrier in helping reduce costs and combined ratio.

In one alternative embodiment, the central, expert-system based circuit comprises a table with stored categorization trigger parameters for triggering a predefined level of scores, wherein the first and second risk transfer parameters and the correlated first and/or second payment transfer parameters are dynamically adapted and/or accumulated by means of the central, expert-system based circuit based on the triggered categorization of the driving motor vehicles during usage and based upon the usage-based and/or user-based and/or operational automotive data captured from the plurality of driving motor vehicles. This embodiment has, inter alia, the advantage that it allows to provide new and unified approach for automated risk-transfer for risk associated with risk-exposed motor vehicles, considering dynamically measured, usage-based parameters, allowing a new optimization in the level of the risk-exposed vehicle as well as on the level of the operational pooling of risk-exposure of the first and/or second risk-transfer system.

In one alternative embodiment, the driving score module triggers and automatically selects score driving parameters based on defined score driving behavior pattern by comparing captured telematics data with the defined score driving behavior pattern. The score driving module can further e.g. automatically capture scores risks according to the measured location or trip of the motor vehicle based on the captured telematics data of the vehicle embedded telematics devices (OEM line fitted) associated with the motor vehicles. This alternative embodiment has, inter alia, the advantage that it allows to provide a real-time adapted multi-tier risk-transfer system. Further, it allows to capture and/or control the score driving behavior (also in the sense of location, time, road etc. of the driving), and compare its behavior within the technical operation and context. It allows to automatically capture score risks according to location or trip, and to automatically analyze and react on data related to the need of added services, as e.g. accident notifications).

In one alternative embodiment, the central, expert-system based circuit comprises additional triggers triggering accident notification and/or other added services based on the captured telematics data of the OEM-linked, telematics-based system and platform for motor vehicle associated with the motor vehicles. This alternative embodiment has, inter alia, the advantage that the system is capable of providing additional benefit to the customer based on additionally generated signaling.

In another alternative embodiment, the switching device comprises capturing means for capturing a transfer of payment from the first insurance system to the second payment-transfer module, wherein the second layer trigger structure of the system is activatable by triggering a payment transfer matching a predefined activation threshold parameter. In another embodiment variant, in the case of triggering the occurrence of a loss associated with the occurrence of the defined risk events, a predefined defined portion of the occurred loss covered by the second insurance system based on the second risk transfer parameters and correlated second payment transfer parameters. Thus, the present invention can be realized with a proportional or a non-proportional risk-transfer as coupling mechanism between the first and second risk-transfer systems, wherein under proportional risk-transfer coupling, the second risk-transfer system is activated by means of the switching device by a fixed percentage share of each risk transferred to the first risk-transfer system respectively each loss transferred to the risk-transfer system. Accordingly, the second risk-transfer system receives that fixed payment transfer from the first risk-transfer system by means of the second payment parameters. Under non-proportional risk-transfer coupling, in case of triggering the exceedance of a defined activation threshold parameter associated with the occurrence of the defined risk events, the occurred loss is at least partly covered by the second insurance system based on the second risk transfer parameters and correlated second payment transfer parameters. The activation threshold can be associated with each single loss occurred or on the accumulated loss measured by means of the aggregated loss parameter. Thus, the non-proportional coupling can be realized in an excess of loss or stop loss risk-transfer structure, wherein the excess of loss structure can e.g. be based on a Per Risk XL (Working XL), Per Occurrence/Per Event XL (Catastrophe or Cat XL), or Aggregate XL structure. As a more particular alternative embodiment, a periodic payment transfers from the risk exposure components to the resource pooling system via a plurality of payment receiving modules is requested by means of a monitoring module of the resource-pooling system, wherein the risk transfer or protection for the risk exposure components is interrupted by the monitoring module, when the periodic transfer is no longer detectable via the monitoring module. As an alternative, the periodic payment transfer request can be interrupted automatically or waived by the monitoring module, when the occurrence of indicators for a risk event is triggered in the data flow pathway of a risk exposure component. These alternative embodiments have, inter alia, the advantage that the system allows for further automation of the monitoring operation, especially of its operation with regard to the pooled resources.

In another alternative embodiment, an independent verification risk event trigger of the first and/or second resource pooling system is activated in cases when the occurrence of indicators for a risk event is triggered in the data flow pathway of the vehicle embedded telematics devices (OEM line fitted) or the central, expert-system based circuit by means of the risk event triggers, and wherein the independent verification risk event trigger additionally issues a trigger in the event of the occurrence of indicators regarding risk events in an alternative data flow pathway with independent measuring parameters from the primary data flow pathway, e.g. of alternative telematics devices, in order to verify the occurrence of the risk events at the risk exposed automotive motor vehicles. In this alternative, the transfer of payments is only assigned to the corresponding risk exposed motor vehicle if the occurrence of the risk event at the risk exposure component is verified by the independent verification risk event trigger. These alternative embodiments have, inter alia, the advantage that the operational and financial stability of the system can thus be improved. In addition, the system is rendered less vulnerable to fraud and counterfeit.

In general, the system can for example comprise capturing means that capture a payment transfer assigned to one of the two risk transfer systems, e.g. also from the first insurance system to the second payment transfer module, wherein the assigned insurance system is activated, and wherein the risk exposure of the first insurance system associated with the assigned risk transfer layer is transferred to the second insurance system. This alternative embodiment has, inter alia, the advantage that additionally the second insurance system distinctively can be activated, allowing a controlled and discrete risk transfer and risk cover from the first to the second resource pooling system.

In another alternative embodiment, the first insurance system comprises an interface module for accessing and adapting the assigned operational parameters prior to the transfer of the payment parameters from the first resource pooling system to the second resource pooling system. This alternative embodiment has, inter alia, the advantage that the risk transfer structure can be dynamically adjusted and, moreover, selected and/or additionally optimized directly by the first insurance system or the second insurance system.

In still another alternative embodiment, the central, expert-system based circuit comprises means for processing risk-related driving motor vehicle data and for providing data regarding the likelihood of said risk exposure for one or a plurality of the pooled risk exposed motor vehicle, in particular, based on the risk-related motor vehicle data, and wherein the receipt and preconditioned storage of payments from the risk exposed motor vehicles for the pooling of their risks can be dynamically determined based on the total risk and/or the likelihood of risk exposure of the pooled risk-exposed motor vehicles. This alternative embodiment has, inter alia, the advantage that the operation of the first and/or second resource pooling system can be dynamically adjusted to changing conditions in relation to the pooled risk, such as a change of the environmental conditions or risk distribution, or the like, of the pooled motor vehicles. A further advantage is that the system does not require any manual adjustments, when it is operated in different environments, places or countries, because the size of the payments of the risk exposed motor vehicles is directly related to the total pooled risk. However, it is important to note, that the present invention does not necessarily have to lead to adjusted pricing or premiums. For example, it could also automatically provide coupons to automated motor vehicles driving in low risk regions, or that nothing at all changes but that the system uses the automotive data to automatically decide if the risk-transfer is continued the next year. The present invention can also exclusively be used for automatically providing and activating adapted and/or specifically selected value added services, as e.g. accident notifications and/or feedback to the motor vehicle or driver and/or automated fleet risk reporting and/or automated and dynamically optimized underwriting etc. Thus, the present invention allows an adaption of the risk of the first risk-transfer tier or system as well as risk on level of the insured motor vehicles (e.g. by risk-based driver feedback in real-time) and/or the second risk-transfer tier or system. There is no prior art system, allowing such an optimization and/or adaption. The feedback can e.g. be generated by comparing the motor vehicle's profile and pattern with other motor vehicle's profiles or pattern at the same location and/or comparable conditions.

In one alternative embodiment, the system comprises means for processing risk-related component data and for providing information regarding the likelihood of said risk exposure for one or a plurality of the pooled risk exposed motor vehicles, in particular, based on risk-related motor vehicles' data, and wherein the receipt and preconditioned storage of payments from the first resource pooling system to the second resource pooling system for the transfer of its risk can be dynamically determined based on the total risk and/or the likelihood of risk exposure of the pooled risk exposure components. This alternative embodiment has, inter alia, the advantage that the operation of the first and/or second resource pooling system can be dynamically adjusted to changing conditions of the pooled risk, such as changes of the environmental conditions or risk distribution, or the like, of the pooled risk components. A further advantage is the fact that the system does not require any manual adjustments, when it is operated in different environments, places or countries, because the size of the payments of the risk exposure components is directly related to the total pooled risk.

In one alternative embodiment, the number of pooled motor vehicles is dynamically adjusted via the first risk-transfer system to a range where non-covariant, occurring risks covered by the risk-transfer system affect only a relatively small proportion of the total pooled risk exposure components at any given time. Analogously, the second risk-transfer system can for example dynamically adjust the number of pooled risk shares transferred from first risk-transfer systems to a range where non-covariant, occurring risks covered by the second risk-transfer system affect only a relatively small proportion of the total pooled risk transfers from first risk-transfer systems at any given time. This variant has, inter alia, the advantage that the operational and financial stability of the system can be improved.

In one alternative embodiment, the risk event triggers are dynamically adjusted by means of an operating module based on time-correlated incidence data for one or a plurality of the predefined risk events. This alternative embodiment has, inter alia, the advantage that improvements in capturing risk events or avoiding the occurrence of such events, for example by improved forecasting systems, etc., can be dynamically captured by the system and dynamically affect the overall operation of the system based on the total risk of the pooled risk exposure components.

In another alternative embodiment, upon each triggering of an occurrence, where parameters indicating a predefined risk event are measured, by means of at least one risk event trigger, a total parametric payment is allocated with the triggering, and wherein the total allocated payment is transferrable upon a triggering of the occurrence. The predefined total payments can for example be leveled to any appropriate defined total sum, such as a predefined value, or any other sum related to the total transferred risk and the amount of the periodic payments of the risk exposed motor vehicle. This alternative has, inter alia, the advantage that the parametric payments or the payments of predefined amounts can be relied on fixed amounts. Further, the parametric payment may allow for an adjusted payment of the total sum that can for example be dependent on the stage of the occurrence of a risk event, as triggered by the system.

BRIEF DESCRIPTION OF THE DRAWINGS

The present invention will be explained in more detail, by way of example, with reference to the drawings in which.

DETAILED DESCRIPTION OF THE PREFERRED EMBODIMENTS

Figure 1:
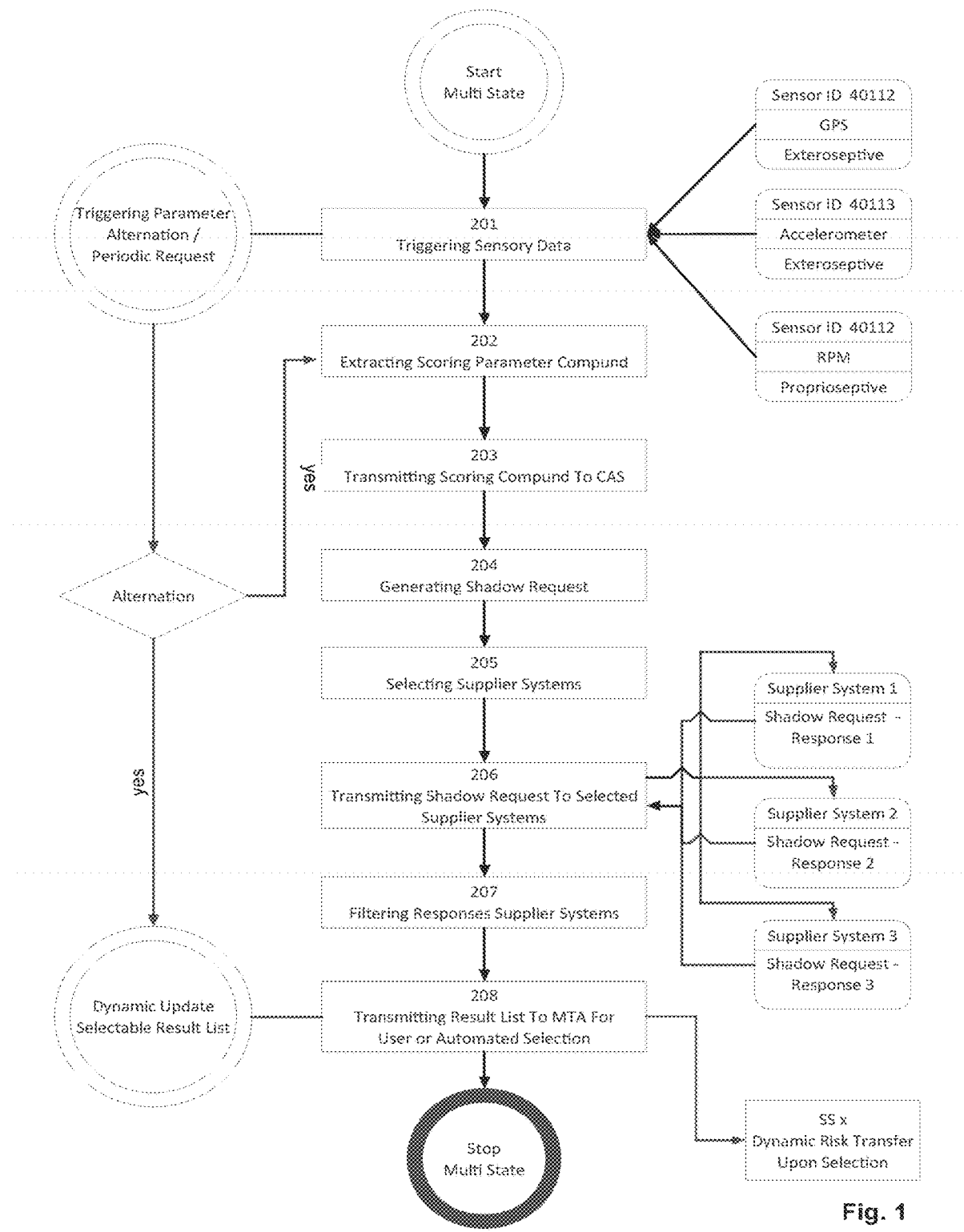
FIG. 1 shows a block diagram schematically illustrating operational flow and processing steps according to an embodiment of the present invention e.g. according to FIG. 2.
Figure 2:
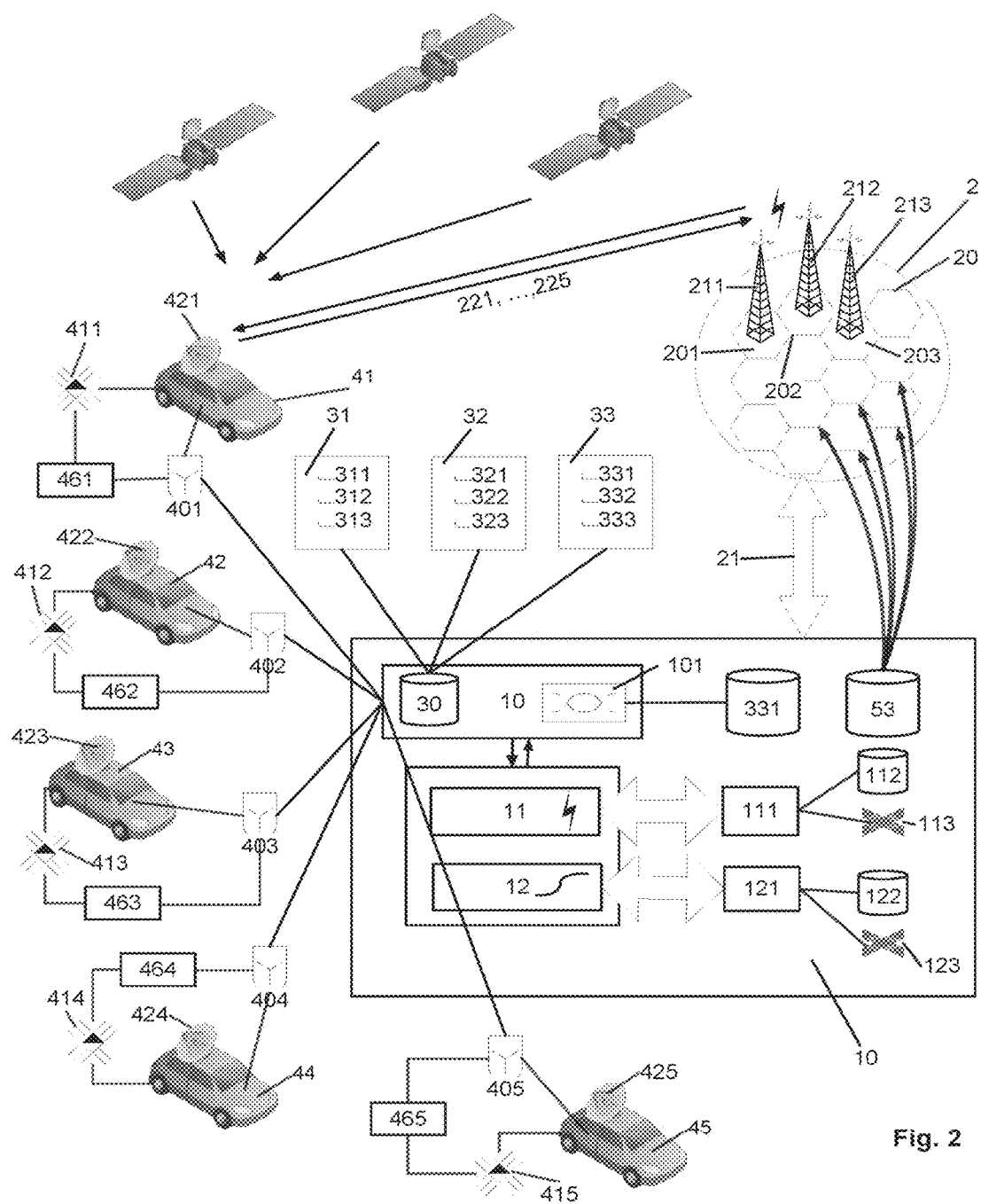
FIG. 2 shows a block diagram schematically illustrating an exemplary OEM-linked, telematics-based system and platform 1 for score-driven operations associated with motor vehicles 41, ..., 45 or transportation means of passengers or goods. The telematics-based system 1 comprises vehicle embedded telematics devices (OEM line fitted) 411, ..., 415 associated with the plurality of motor vehicles 41, ..., 45. The telematics devices 411, ..., 415 are connected via the interfaces 421, ..., 425 to the sensors and/or measuring devices 401, ..., 405 and/or an on-board diagnostic system 431, ..., 435 and/or an in-car interactive device 441, ..., 445, and wherein the telematics devices 411, ..., 415 capture usage-based 31 and/or user-based 32 and/or operational 33 telematics data 3 of the motor vehicle 41, ..., 45 and/or user 321, 322, 323.
Figure 3:
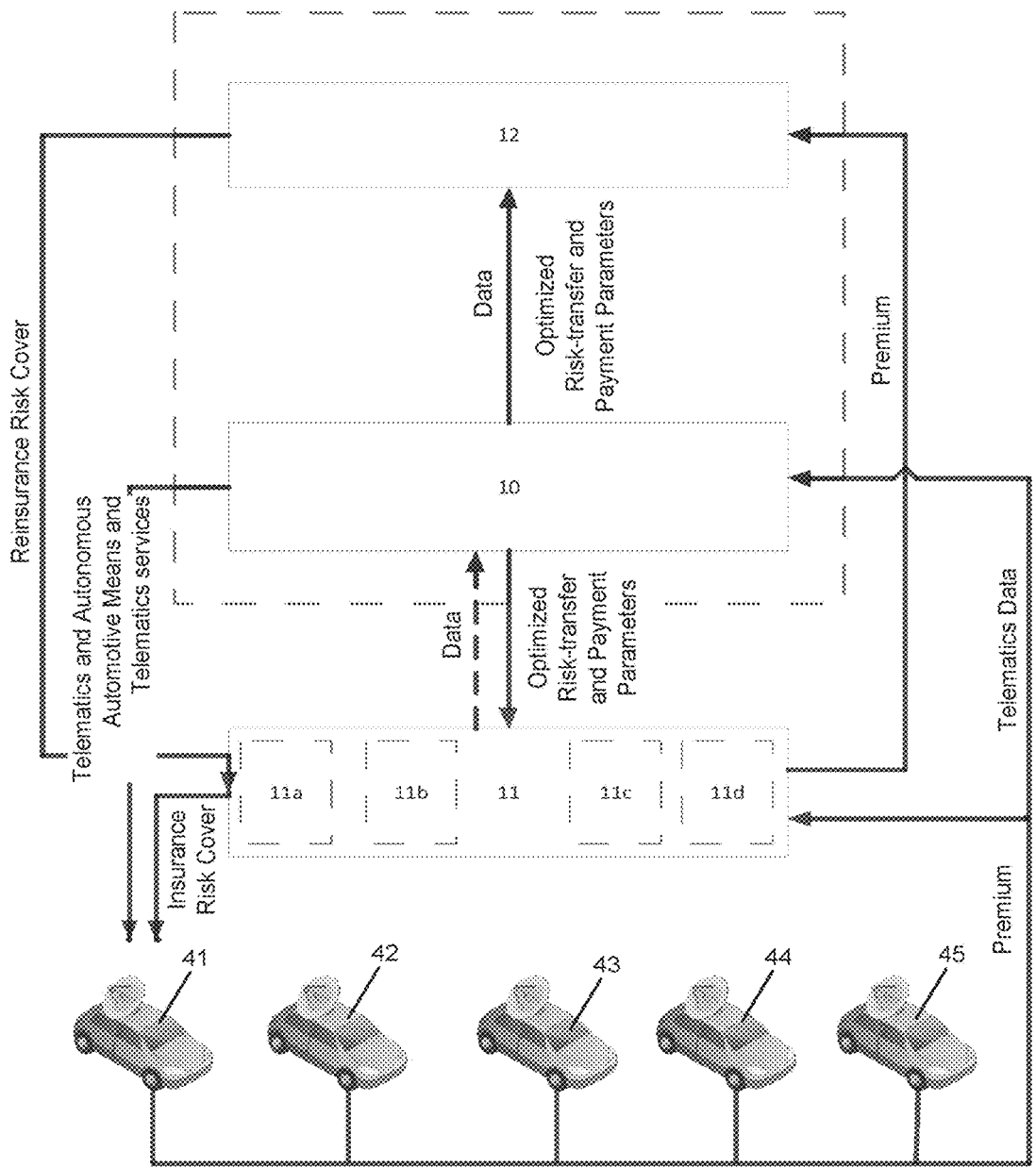
FIG. 3 shows another block diagram schematically illustrating an exemplary OEM-linked, telematics-based system and platform 1 for score-driven operations associated with motor vehicles 41, ..., 45 or transportation means of passengers or goods. The telematics-based system 1 comprises vehicle embedded telematics devices (OEM line fitted) 411, ..., 415 associated with the plurality of motor vehicles 41, ..., 45. The telematics devices 411, ..., 415 are connected via the interfaces 421, ..., 425 to the sensors and/or measuring devices 401, ..., 405 and/or an on-board diagnostic system 431, ..., 435 and/or an in-car interactive device 441, ..., 445, and wherein the telematics devices 411, ..., 415 capture usage-based 31 and/or user-based 32 and/or operational 33 telematics data 3 of the motor vehicle 41, ..., 45 and/or user 321, 322, 323. The system 1 is capable of capturing different kinds of telematics data 3, as also e.g. driving behavior from the user and/or whether the motor vehicle 41, ..., 45 is driving itself (auto piloting) and/or the motor vehicle 41, ..., 45 is intervening with its automated or safety features. The latter is possible, if the central, expert-system based circuit 10 capture data 3 from the motor vehicle 41, ..., 45 itself. The vehicle embedded telematics devices (OEM line fitted) can generate data 3 themselves by means of sensors of the motor vehicles' systems, e.g. provided by an on-board diagnostic system. As seen from FIG. 3, the central, expert-system based circuit 10 is realized as a separate part of the OEM-linked, telematics-based system and platform 1, or as a part of the second risk-transfer system 12, wherein in the latter case, the scoring data can be provided by the second risk-transfer system 12 to the first risk-transfer system 12 and/or the risk exposed motor vehicles 41, ..., 45, in exchange of having access to the captured telematics data 3 and/or captured claim or loss data 711, ..., 715/721, ..., 725/731, ..., 735. As also illustrated by FIG. 3, the OEM-linked, telematics-based system and platform 1 may comprise one first risk-transfer system 11 or a plurality of first risk-transfer systems 11a-11d, all associated with the same second risk-transfer system 12.
Figure 4:
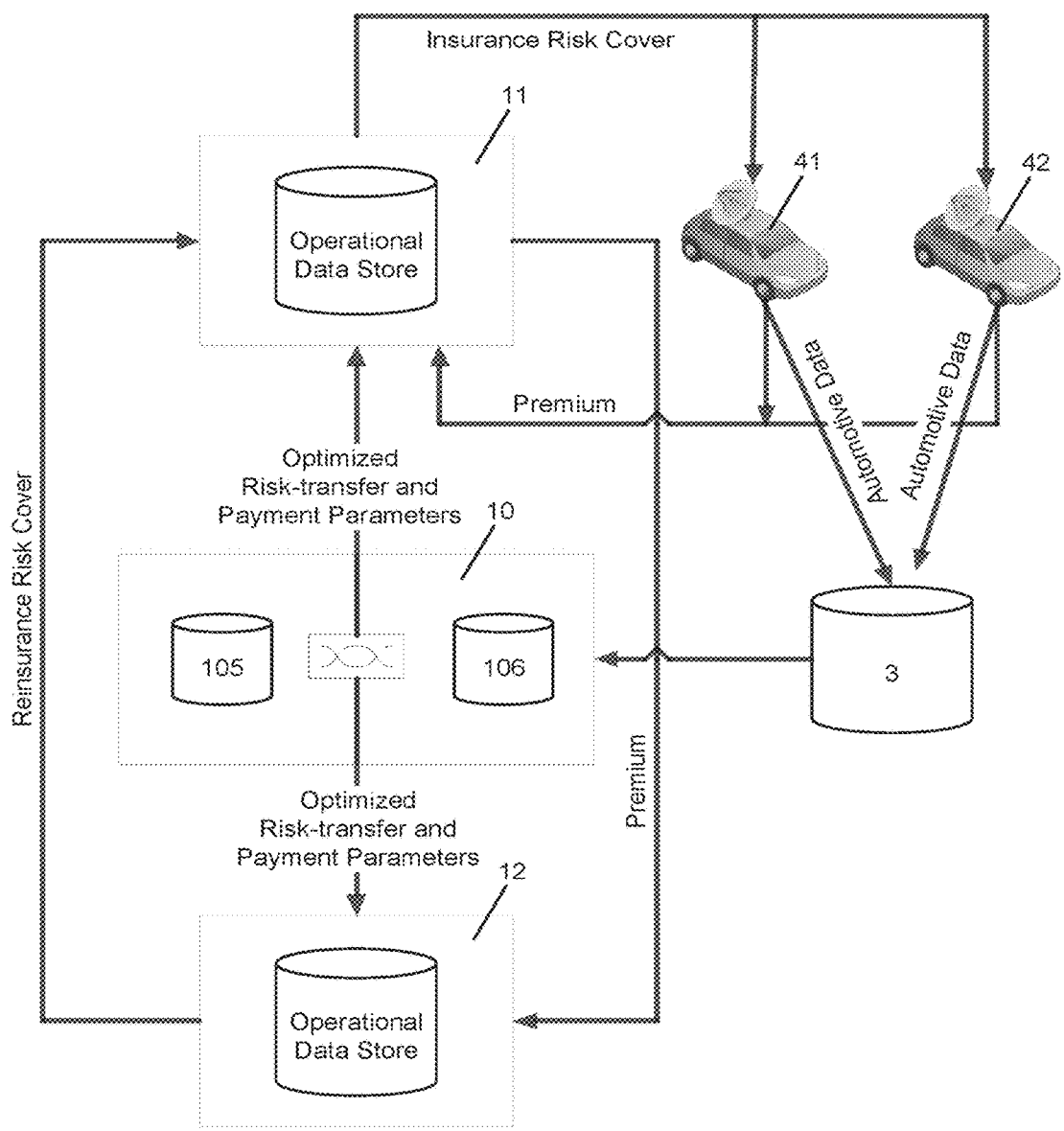
FIG. 4 shows another block diagram schematically illustrating an exemplary dynamically adaptable automotive car system 1 with vehicle embedded telematics devices (OEM line fitted) 411, ..., 415 associated with a plurality of risk-exposed motor vehicles 41, ..., 45, according an embodiment variant of the invention. In particular, it shows a central, expert-system based circuit 10. The vehicle embedded telematics devices (OEM line fitted) capture usage-based 31 and/or user-based 32 telematics data 3 of the motor vehicle 41, ..., 45 and/or user 321, 322, 323, and transmit them via the data transmission network 2 to the central, expert-system based circuit 10, which cooperates the coupled first and second risk-transfer systems 11/12.
Figure 5:
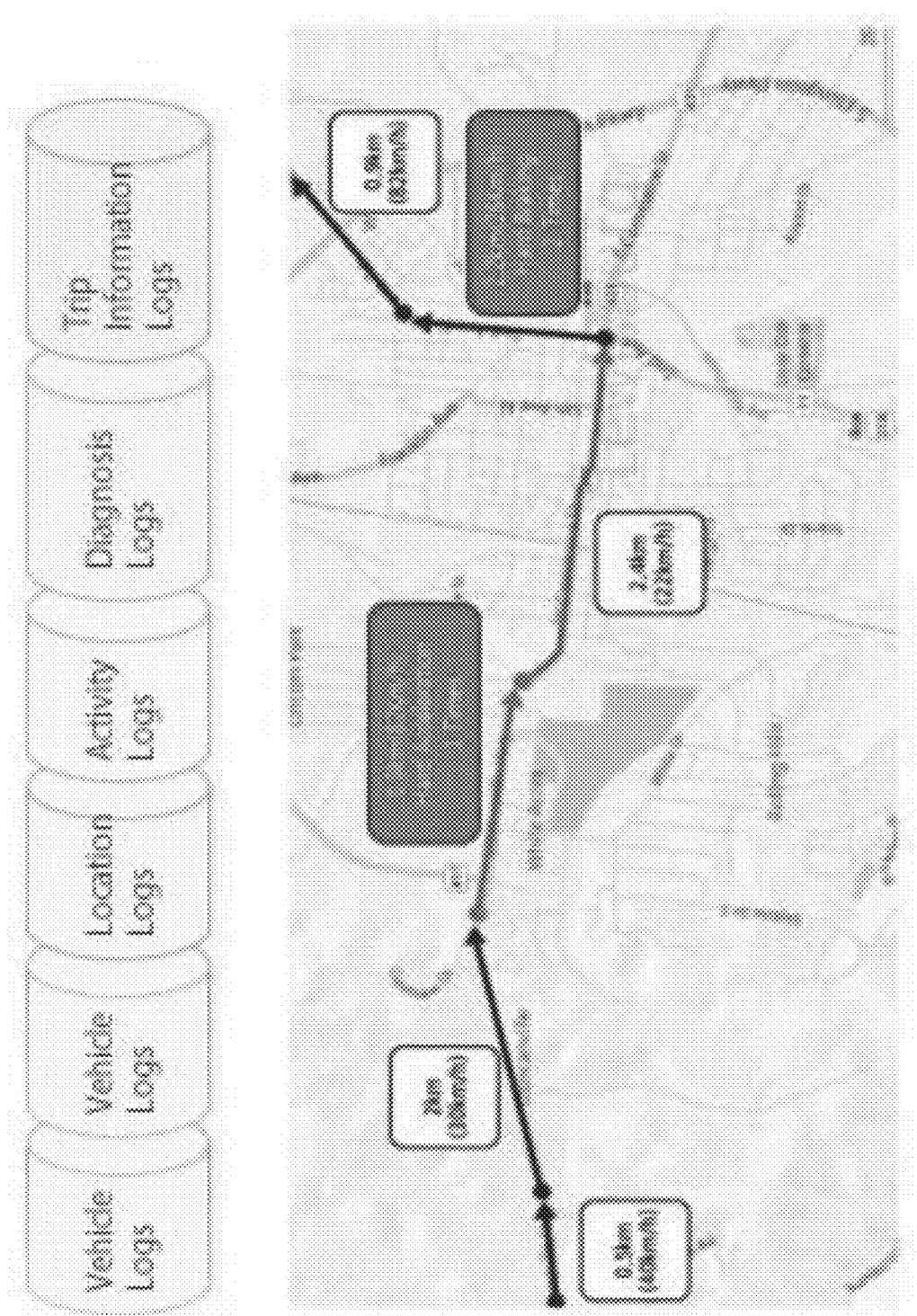
FIG. 5 shows a block diagram schematically illustrating exemplary vehicle embedded telematics devices (OEM line fitted) 411, ..., 415 and real-time telematics data capturing.

FIG. 2 schematically illustrates an architecture for a possible implementation of an embodiment of the OEM-linked, telematics-based system and platform 1 for score-driven operations associated with motor vehicles 41, ..., 45 or transportation means of passengers or goods, in particularly providing a dynamic, telematics-based, OEM-linked system and platform and telematics data aggregator by means of a central, expert-system based circuit 10 and vehicle embedded telematics devices (OEM line fitted) 411, ..., 415. The OEM-linked, telematics-based system lreacts in real-time, dynamically on captured environmental or operational parameters 3, in particular on monitored and captured automotive parameters 3 of motor vehicles 41, ..., 45 during operation. The present invention further is able to provide a telematics based automated risk-transfer, alert and real-time notification systems for motor vehicles 41, ..., 45 and wireless technology used in the context of telematics. Finally, the present system 1 also provides to telematics-based real-time expert systems. Thus, the inventive system 1 provides a structure for the use of telematics together with real-time risk-monitoring, automated risk-transfer and insurance systems based on captured and measured usage-based and/or user-based telematics data 3.

To provide the dynamic, OEM-linked, telematics-based system, the telematics-based system 1 captures and categorizes risk-transfer profiles 114 in a result list 108, wherein the result list 108 is provided for display and selection to a user of the motor vehicle 41, ..., 45 via the dashboard (or another interface) of the motor vehicle 41, ..., 45 by means of the central, expert-system based circuit 10.

The vehicle embedded telematics devices (OEM line fitted) 411, ..., 415 comprises one or more data transmission connection to on-board sensors and measuring devices 401, ..., 405 of the motor vehicle 41, ..., 45 and/or an on-board diagnostic system 431, ..., 435 and/or an in-car interactive device 441, ..., 445 of a motor vehicle 41, ..., 45. The on-board sensors and measuring devices 401, ..., 405 and/or the on-board diagnostic system 431, ..., 435 and/or the in-car interactive device 441, ..., 445 comprises proprioceptive sensors 4021 for sensing operating parameters 40121 of the motor vehicle 41, ..., 45 and/or exteroceptive sensors 4011 for sensing environmental parameters 40111 during operation of the motor vehicle 41, ..., 45. The exteroceptive sensors or measuring devices 4011 can, for example, comprise at least radar devices 40117 for monitoring surrounding of the motor vehicle 41, ..., 45 and/or LIDAR devices 40115 for monitoring surrounding of the motor vehicle 41, ..., 45 and/or global positioning systems 40122 or vehicle tracking devices for measuring positioning parameters of the motor vehicle 41, ..., 45 and/or odometrical devices 40114 for complementing and improving the positioning parameters measured by the global positioning systems 40112 or vehicle tracking devices and/or computer vision devices 40116 or video cameras for monitoring the surrounding of the motor vehicle 41, ..., 45 and/or ultrasonic sensors 40113 for measuring the position of objects close to the motor vehicle 41, ..., 45. The proprioceptive sensors or measuring devices 4012 for sensing operating parameters 40121 of the motor vehicles 41, ..., 45 can at least comprise motor speed and/or wheel load and/or heading and/or battery status of the motor vehicles 41, ..., 45. The one or more wireless connections 4210 or wired connections 4211 of the vehicle embedded telematics devices (OEM line fitted) 411, ..., 415 can e.g. comprise Bluetooth (IEEE 802.15.1) or Bluetooth LE (Low Energy) 42101 as wireless connection for exchanging data using short-wavelength UHF (Ultra high frequency) radio waves in the ISM (industrial, scientific and medical) radio band from 2.4 to 2.485 GHz by building a personal area networks (PAN) with the on-board Bluetooth capabilities and/or 3G and/or 4G and/or GPS and/or Bluetooth LE (Low Energy) and/or BT based on Wi-Fi 802.11 standard, and/or a contactless or contact smart card, and/or a SD card (Secure Digital Memory Card) or another interchangeable non-volatile memory card.

For providing the wireless connection 4210, the vehicle embedded telematics devices (OEM line fitted) 411, ..., 415 can e.g. act as wireless node within a corresponding data transmission network by means of antenna connections of the vehicle embedded telematics devices (OEM line fitted) 411, ..., 415, in particular, as mentioned, mobile telecommunication networks as e.g. 3G, 4G, 5G LTE (Long-Term Evolution) networks or mobile WiMAX or other GSM/EDGE and UMTS/HSPA based network technologies etc., and more particular with appropriate identification means as SIM (Subscriber Identity Module) etc. The vehicle embedded telematics devices (OEM line fitted) 411, ..., 415 can e.g. be connected to an on-board diagnostic system 431, ..., 435 and/or an in-car interactive device 441, ..., 445, wherein the vehicle embedded telematics devices (OEM line fitted) 411, ..., 415 capture usage-based 31 and/or user-based 32 automotive data 3 of the motor vehicle 41, ..., 45 and/or user. The vehicle embedded telematics devices (OEM line fitted) 411, ..., 415 can e.g. provide the one or more wireless connections 4210 by means radio data systems (RDS) modules and/or positioning system including a satellite receiving module and/or a mobile cellular phone module including a digital radio service module and/or a language unit in communication the radio data system or the positioning system or the cellular telephone module. The satellite receiving module can e.g. comprise a Global Positioning System (GPS) circuit and/or the digital radio service module comprises at least a Global System for Mobile Communications (GSM) unit. The plurality of interfaces of the mobile telecommunication apparatus 10 for connection with at least one of a motor vehicle's data transmission bus can e.g. comprise at least on interface for connection with a motor vehicle's Controller Area Network (CAN) bus, e.g. in connection with on-board diagnostics (OBD) port, or other connection e.g. for battery installed devices, or also OEM (Original Equipment Manufacturer) installed systems getting information access to on-board sensors or entertainment systems (as e.g. Apple Carplay etc.) providing the necessary vehicle sensor information. The measured operating parameters 40121 and/or environmental parameters 40111 during operation of the motor vehicle 41, ..., 45 can e.g. comprise time-dependent speed measuring, hard breaking, acceleration, cornering, distance, mileage (PAYD), short journey, time of day, road and terrain type, mobile phone usage (while driving), weather/driving conditions, location, temperature, blind spot, local driving, sun angle and dazzling sun information (sun shining in drivers' face), seatbelt status, rush hour, fatigue, driver confidence, throttle position, lane changing, fuel consumption, VIN (vehicle identification number), slalom, excessive RPM (Revolutions Per Minute), off road, G forces, brake pedal position, driver alertness, CAN (Controller Area Network) bus (vehicle's bus) parameters including fuel level, distance to other vehicles, distance to obstacles, driver alertness, activated/usage of automated features, activated/usage of Advanced Driver Assistance Systems, traction control data, usage of headlights and other lights, usage of blinkers, vehicle weight, amount of vehicle passengers, traffic sign information, junctions crossed, jumping of orange and red traffic lights, alcohol level detection devices, drug detection devices, driver distraction sensors, driver aggressiveness, driver mental and emotional condition, dazzling headlights from other vehicles, vehicle door status (open/closed), visibility through windscreens, lane position, lane choice, vehicle safety, driver mood, and/or passengers' mood. Up-to-now, no prior art system is able to process such a variety of dynamic-monitored, risk-relevant data. The advantage of the generated score parameters mirrors the captured sensory data in that the data components of the score can even e.g. comprise: customer policy details, individual driving data, crash forensics data, credit scores, statistical driving data, historic claims data, market databases, driving license points, statistical claims data, context data of weather or road type or surrounding.

The central, expert-system based circuit 10 comprises a vehicle-telematics driven core aggregator 100 with telematics data-based triggers 1001 triggering, capturing, and monitoring in the dataflow pathway 451, ..., 455 of the sensors 401, ..., 405 and/or the on-board diagnostic system 431, ..., 435 and/or the in-car interactive device 441, ..., 445 of the motor vehicle 41, ..., 45 said operating parameters 40121 and/or environmental parameters 40111 during operation of the motor vehicle 41, ..., 45. The vehicle embedded telematics devices (OEM line fitted) 411, ..., 415 can e.g. comprise at least a GPS module (Global Positioning System) and/or geological compass module based on a 3-axis teslameter and a 3-axis accelerometer, and/or gyrosensor or gyrometer, and/or a MEMS accelerometer sensor comprising a consisting of a cantilever beam with the seismic mass as a proof mass measuring the proper or g-force acceleration, and/or a MEMS magnetometer or a magnetoresistive permalloy sensor or another three-axis magnetometers.

The central, expert-system based circuit 10 comprises a driving score module 101 measuring and/or generating a single ora compound set of variable scoring parameters 1011, ..., 1013 profiling the use and/or style and/or environmental condition of driving during operation of the motor vehicle 41, . . . , 45 based upon the triggered, captured, and monitored operating parameters 40111 or environmental parameters 40121. Thus, system 1 scores individual drivers based on the monitored operating parameters 40111 or environmental parameters 40121. Based on the score and/or other relevant telematics data visible to consumers and the risk-transfer provider (insurers) (if consumer agrees), the first risk-transfer systems 10 are able to quote. The single or compound set of variable scoring parameters 1011, . . . , 1013 are profiling the use and/or style and/or environmental condition of driving during operation of the motor vehicle 41, . . . , 45 and can be e.g. generated by means of the driving score module 101 at least comprise scoring parameters measuring a driving score and/or a contextual score and/or a vehicle safety score. For the driving score, the contextual score and the vehicle safety score, (i) the variable driving scoring parameter is at least based upon a measure of driver behavior parameters comprising speed and/or acceleration and/or braking and/or cornering and/or jerking, and/or a measure of distraction parameters comprising mobile phone usage while driving and/or a measure of fatigue parameters and/or drug use parameters, (ii) the variable contextual scoring parameter is at least based upon measured trip score parameters based on road type and/or number of intersection and/or tunnels and/or elevation, and/or measured time of travel parameters, and/or measured weather parameters and/or measured location parameters, and/or measured distance driven parameters, and (iii) the variable vehicle safety scoring parameter is at least based upon measured ADAS feature activation parameters and/or measured vehicle crash test rating parameters and/or measured level of automation parameters of the motor vehicle 41, . . . , 45 and/or measured software risk scores parameters. This innovation makes it possible to link all main contributors of accidents to risk relevant data points and risk drivers, provided by the OEMs, for scoring and risk measuring/assessment technical objects. By means of the CAN-BUS or TCU (Telematics control unit) data of the vehicle, the scoring and risk measurement/assessment can be achieved more accurately and in more precise manner for end consumers leading to an improved and optimized client centric experience and risk selection. Measuring the main contributors, they can e.g. be given on the example of main contributors to accidents in USA as follows: (1) Distracted driving, (2) Speeding, (3) Drunk driving, (4) Reckless driving, (5) Rain, (6) Running red lights, (7) Running stop signs, (8) Teenage drivers, (9) Night driving, (10) Car design effects. A data link 21 is set by means of the wireless connection 4210 of the vehicle embedded telematics devices (OEM line fitted) 411, . . . , 415 over a mobile telecommunication network 2 between the vehicle embedded telematics devices (OEM line fitted) 411, . . . , 415 as client and the central, expert-system based circuit 10. The mobile telematics devices 411, . . . , 415 act as wireless node 221, . . . , 225 within said mobile telecommunication network 2. The central expert-system based circuit 10 automatically generates said single or set compound of variable scoring parameters. Exemplary scores' measuring parameters could be as follows: e.g., driving score such as speed, acceleration, jerking, distraction, fatigue, traffic lights, distance (following too close), etc and a contextual score such as wheather, road types, road signs, etc and vehicle safety score such as activated/usage of automated features, etc.

A shadow request 109 is transmitted to a plurality of automated first risk-transfer systems 11, decentrally connected to the central, expert-system based circuit 10 over a data transmission network. The shadow request 109 comprises at least risk-relevant parameters based upon the measured and/or generated single or compound set of variable scoring parameters 1011, . . . , 1013. The central, expert-system based circuit 10 receives in response to the emitted shadow request 109 a plurality of individualized risk-transfer profiles 114 based upon the dynamically collected single or compound set of variable scoring parameters 1011, . . . , 1013. The risk-relevant parameters of the shadow request 109 comprise at least usage-based 31 and/or user-based 32 and/or operating 33 telematics data 3 measured and/or generated by the vehicle embedded telematics devices (OEM line fitted) 411, . . . , 415 based upon the triggered, captured, and monitored operating parameters 40111 or environmental parameters 40121, and the generated single or set compound of variable scoring parameters 1011, . . . , 1013. The shadow requests 109 can e.g. be periodically transmitted to the plurality of automated first risk-transfer systems 11 based on the dynamically generated single or compound set of variable scoring parameters 1011, . . . , 1013 and/or the triggered, captured, and monitored operating parameters 40111 or environmental parameters 40121. A result list 108 can be dynamically adapted in real-time and displayed to the user for selection via the dashboard 461, . . . , 465 or another interactive device of the motor vehicles 41, . . . 45. However, the shadow requests 109 can also be generated and transmitted to the plurality of automated first risk-transfer systems 11 based on the dynamically generated single or compound set of variable scoring parameters 1011, . . . , 1013 and/or the triggered, captured, and monitored operating parameters 40111 or environmental parameters 40121, if the central, expert-system based circuit 10 triggers an alternation of the dynamically generated single or compound set of variable scoring parameters 1011, . . . , 1013 and/or the triggered, captured, and monitored operating parameters 40111 or environmental parameters 40121. The result list 108 can be dynamically adapted in real-time and displayed to the user for selection. As embodiment variant, also a combination of the two before mentioned shadow request generations may be applied.

The central, expert-system based circuit 10 dynamically captured and categorized the received plurality of individualized risk-transfer profiles 114 of the automated first risk-transfer systems 11. The result list 108 can be dynamically updated and provided for display and selection to the user of the motor vehicle 41, . . . , 45 by means of the motor vehicles' dashboards 461, . . . , 465 based upon the triggered, captured, and monitored operating parameters 40121 or environmental parameters 40111 during operation of the motor vehicle 41, . . . , 45. Therefore, the plurality of individualized risk-transfer profiles 114, provided by the automated first risk-transfer systems 11, time-dependently vary based on the generated single or compound set of variable scoring parameters 1011, . . . , 1013 measuring the time-dependent use and/or style and/or environmental condition of driving during operation of the motor vehicle 41, . . . , 45. The mobile automotive system 1 can e.g. automatically alert the user, if a more preferable risk-transfer profile 114 is triggered in relation to a before selected risk-transfer profile 114. Further, the OEM-linked, telematics-based system and platform 1 can also automatically adapt a risk-transfer associated with a user or motor vehicle 41, . . . , 45, if a more preferable risk-transfer profile 114 is triggered in relation to a selected risk-transfer profile 114. The result list 108 can dynamically be adapted in real-time and displayed to the user for selection based upon definable categorization criteria as for example first payment parameters 1121, . . . , 1125 and/or duration and/or risk-transfer structure.

The invention claimed is:

1. An Original Equipment Manufacturer ("OEM")-linked, telematics-based system dynamically triggering automated, telematics-based automotive systems based on real-time capturing of vehicle telematics data for score-driven operations associated with motor vehicles or transportation of passengers or goods based on real-time scoring and measurements associated with motor vehicles with a dynamic triggered and dynamically adjustable, multi-tier risk-transfer system with a dynamic floating first-tier level risk-transfer, the telematics-based system comprising:

vehicle embedded telematics devices (OEM line fitted) associated with the plurality of motor vehicles, the vehicle embedded telematics devices (OEM line fitted) having one or more wireless connections or wired connections providing a plurality of interfaces for connection with at least one of a vehicle's data transmission bus, with sensors and measuring devices, wherein
when providing the wireless connection, the telematics devices acts as a wireless node within a corresponding data transmission network via antenna connections of the telematics devices, and
the vehicle embedded telematics devices are connected via the interfaces to the sensors or measuring devices or an on-board diagnostic system,
the vehicle embedded telematics devices capture usage-based or user-based or operational telematics data of the motor vehicles or user;

one or more dynamically triggered and adjusted first risk-transfer systems to provide a dynamic floating first risk-transfer based on first risk transfer parameters from at least some of the motor vehicles to one of the first risk-transfer systems, wherein the first risk-transfer systems includes circuitry configured to receive and store first payment parameters associated with risk-transfer of risk exposures of said motor vehicles for pooling of their risks; and a second risk-transfer system to provide a second risk-transfer based on second risk-transfer parameters from one or more of the first risk-transfer systems to the second risk-transfer system, wherein the second risk-transfer system includes circuitry configured to receive and store second payment parameters for pooling of the risks of the first risk-transfer systems associated with risk exposures transferred to the first risk-transfer systems, wherein
the plurality of vehicle embedded telematics devices (OEM line fitted) of the motor vehicles are connected via said data transmission network to a central, expert-system-based circuit associated with the second risk-transfer system,
a data link is set via the wireless connection between the vehicle embedded telematics devices and the central, expert-system based circuit transmitting at least the captured usage-based or user-based or operational telematics data from the vehicle embedded telematics devices (OEM line fitted) to the central, expert-system based circuit, wherein
by way of a vehicle-telematics driven aggregator of a central, expert-system based circuit associated with the second risk-transfer system, risk-related, usage-based or user-based telematics data captured from the vehicle embedded telematics devices (OEM line fitted) are triggered and monitored via telematics data-based triggers in the dataflow pathway of the vehicle embedded telematics devices (OEM line fitted),
the central, expert-system based circuit associated with the second risk-transfer system is further configured to measure or generate a single or a compound set of variable scoring parameters profiling the use or style or environmental condition of driving during operation of the motor vehicles based upon the captured, triggered and monitored risk-related usage-based or user-based or operational telematics data,
the central, expert-system based circuit associated with the second risk-transfer system transmits periodically a shadow request to at least one of the first risk-transfer systems decentrally connected to the central, expert-system based circuit over a data transmission network, the shadow request including at least said single or a compound set of variable scoring parameters or risk-relevant parameters based upon the captured, triggered and monitored risk-related usage-based or user-based or operational telematics data,
in response to the emitted shadow request, individualized risk-transfer profiles, based upon the dynamically collected single or compound set of variable scoring parameters, are transmitted from at least one first risk-transfer systems to a corresponding motor vehicle and issued via a dashboard of the motor vehicle for selection by the driver of the motor vehicles,
in return of issuing an individualized risk-transfer profile over said dashboard, payment-transfer parameters are transmitted from the first risk-transfer system to the OEM of the OEM-linked, telematics-based system, wherein
the individualized risk-transfer profile provided by the automated first risk-transfer systems time-dependently vary based on the generated single or compound set of variable scoring parameters measuring the time-dependent use and/or style and/or environmental condition of driving during operation of the motor vehicle, and wherein the risk-transfer of the dynamic floating first-tier level risk-transfer is adaptable, if a more preferable risk-transfer profile is triggered in relation to a selected risk-transfer profile, and
the risk-transfer profiles are captured and categorized in a dynamic result list by way of the central, expert-system based circuit, wherein shadow requests are periodically transmitted to the plurality of automated first risk-transfer systems based on the dynamically generated single or compound set of variable scoring parameters and/or the triggered, captured, and monitored usage-based and/or user-based and/or operational telematics data, and wherein the result list is dynamically adapted in real-time and displayed to the user for selection by way of the dashboard.

2. The OEM-linked, telematics-based system according to claim 1, wherein the central, expert-system based circuit transmits the shadow request to a corresponding first risk-transfer system, when transmission of the shadow request is permitted by an access control circuit of the OEM of the OEM-linked, telematics-based system, wherein the single or a compound set of variable scoring parameters are generated via the circuitry the second risk-transfer system.

3. The OEM-linked, telematics-based system according to claim 2, wherein the access control circuit includes a definable distribution table having a variable list with at least one first risk-transfer system, wherein the transmission of the shadow request to a specific first risk-transfer system depends on the definable distribution table of the access control.

4. The OEM-linked, telematics-based system according to claim 1, wherein an individualized risk-transfer profile of a first risk-transfer system is only issued via the dashboard of the motor vehicle for selection by the driver, when issuance is permitted by an access control circuit of the OEM of the OEM-linked, telematics-based system.

5. The OEM-linked, telematics-based system according to claim 1, wherein the single or compound set of variable scoring parameters profiling the use or style or environmental condition of driving during operation of the motor vehicle and generated via the central, expert-system based circuit at least include scoring parameters measuring a driving score or a contextual score or a vehicle safety score.

6. The OEM-linked, telematics-based system according to claim 5, wherein the contextual score is at least based upon measured trip score parameters based on road type or number of intersection or tunnels or elevation, or measured time of travel parameters, or measured weather parameters or measured location parameters, or measured distance driven parameters.

7. The OEM-linked, telematics-based system according to claim 5, wherein the vehicle safety score is at least based upon measured feature activation parameters or measured vehicle crash test rating parameters or measured level of automation parameters of the motor vehicle or measured software risk scores parameters.

8. The OEM-linked, telematics-based system according to claim 1, wherein the variable driving scoring parameter is at least based upon a measure of driver behavior parameters including speed or acceleration or braking or cornering or jerking, or a measure of distraction parameters including mobile phone usage while driving or a measure of fatigue parameters or drug use parameters.

9. The OEM-linked, telematics-based system according to claim 1, wherein the individualized risk-transfer profile provided by the automated first risk-transfer systems time-dependently vary based on the generated single or compound set of variable scoring parameters measuring time-dependent use or style or environmental condition of driving during operation of the motor vehicle.

10. The OEM-linked, telematics-based system according to claim 1, wherein the on-board sensors or measuring devices or an on-board diagnostic system or an in-car interactive device include proprioceptive sensors for sensing operating parameters of the motor vehicle or exteroceptive sensors for sensing environmental parameters during operation of the motor vehicle.

11. The OEM-linked, telematics-based system according to claim 10, wherein the exteroceptive sensors or measuring devices include at least radar devices for monitoring surrounding of the motor vehicle or LIDAR devices for monitoring surrounding of the motor vehicle or global positioning systems or vehicle tracking devices for measuring positioning parameters of the motor vehicle or odometrical devices for complementing and improving the positioning parameters measured by the global positioning systems or vehicle tracking devices or computer vision devices or video cameras for monitoring the surrounding of the motor vehicle or ultrasonic sensors for measuring the position of objects close to the motor vehicle.

12. The OEM-linked, telematics-based system according to claim 1, wherein the automated first risk-transfer system provides a first risk-transfer based on first risk transfer parameters from the motor vehicle to the respective first risk-transfer system, wherein the first risk-transfer system circuitry is configured to receive and store first payment parameters associated with risk-transfer of risk exposures of said motor vehicles for pooling of their risks.

13. The OEM-linked, telematics-based system according to claim 1, wherein the risk-relevant parameters of the shadow request include at least parts of the generated single or set compound of variable scoring parameters or at least parts of the usage-based or user-based or operating telematics data captured by the vehicle embedded telematics devices (OEM line fitted).

14. The OEM-linked, telematics-based system according to claim 1, wherein the one or more wireless connections or wired connections of the vehicle embedded telematics devices (OEM line fitted) include Bluetooth or Bluetooth LE or Wi-Fi or WiMAX as wireless connection for exchanging data using short-wavelength UHF (Ultra high frequency) radio waves in the ISM (industrial, scientific and medical) radio band from 2.4 to 2.485 GHz by building a personal area networks with the on-board Bluetooth capabilities or Bluetooth LE (Low Energy) or 3G or 4G or GPS or GPRS or BT based on Wi-Fi 802.11 standard or WiMAX, or a contactless or contact smart card, or a SD card (Secure Digital Memory Card) or another interchangeable non-volatile memory card.

15. The OEM-linked, telematics-based system according to claim 10, wherein the exteroceptive sensors or measuring devices for sensing environmental parameters at least include distances to objects or intensity of the ambient light or sound amplitude.

16. The OEM-linked, telematics-based system according to claim 10, wherein the proprioceptive sensors or measuring devices for sensing operating parameters of the motor vehicles include at least motor speed or wheel load or heading or battery status of the motor vehicles.

17. The OEM-linked, telematics-based system according to claim 1, wherein the on-board sensors and measuring devices include at least a GPS device or a GSM device with GSM tracking via GSM triangulation or geological compass device based on a 3-axis teslameter and a 3-axis accelerometer, or gyrosensor or gyrometer, or a MEMS accelerometer sensor including a cantilever beam with the seismic mass as a proof mass measuring the proper or g-force acceleration, or a MEMS magnetometer or a magnetoresistive permalloy sensor or another three-axis magnetometers or a three-axis MEMS-based gyroscopes or an appropriate MEMS-based inertial measurement device incorporating up to all nine axes of sensing in a single integrated circuit.

18. The OEM-linked, telematics-based system according to claim 1, wherein the risk-transfer profiles are captured and categorized in a dynamic result list via the central, expert-system based circuit, wherein shadow requests are periodically transmitted to the plurality of automated first risk-transfer systems based on the dynamically generated single or compound set of variable scoring parameters or the triggered, captured, and monitored usage-based or user-based or operational telematics data, and wherein the result list is dynamically adapted in real-time and displayed to the user for selection via the dashboard.

19. The OEM-linked, telematics-based system according to claim 18, wherein the result list is dynamically adapted in real-time and displayed to the user for selection based upon definable categorization criteria including first payment parameters or duration or risk-transfer structure.

20. The OEM-linked, telematics-based system according to claim 1, wherein the risk-transfer profiles are captured and categorized in the result list via the central, expert-system based circuit, wherein shadow requests are generated and transmitted to the plurality of automated first risk-transfer systems based on the dynamically generated single or compound set of variable scoring parameters or the triggered, captured, and monitored usage-based or user-based telematics data, when the central, expert-system based circuit triggers an alternation of the dynamically generated single or compound set of variable scoring parameters or the triggered, captured, and monitored usage-based or user-based or operational telematics data, and wherein the result list is dynamically adapted in real-time and displayed to the user for selection via the dashboard.

21. The OEM-linked, telematics-based system according to claim 1, wherein the OEM-linked, telematics-based system automatically alerts the user, when a more preferable risk-transfer profile is triggered in relation to a selected risk-transfer profile.

22. The OEM-linked, telematics-based system according to claim 1, wherein the OEM-linked, telematics-based system automatically adapts a risk-transfer of a user, when a more preferable risk-transfer profile is triggered in relation to a selected risk-transfer profile.

23. The OEM-linked, telematics-based system according to claim 1, wherein the transmitted shadow request with the risk-related telematics data is processed via the selected, automated first risk-transfer systems, wherein first risk transfer parameters and correlated first payment transfer parameters are generated via the automated first risk-transfer systems, and wherein, in the case of triggering the occurrence of one of defined risk events associated with transferred risk exposure of the motor vehicles, an occurred loss is automatically covered by the corresponding automated first risk-transfer system based on the first risk transfer parameters and correlated first payment transfer parameters.

24. The OEM-linked, telematics-based system according to claim 1, wherein the OEM-linked, telematics-based system includes a second risk-transfer system to provide a second risk-transfer based on second risk-transfer parameters from the automated first risk-transfer system to the second risk-transfer system, wherein the second risk-transfer system circuitry is configured to receive and store second payment parameters for pooling of the risks of the first risk-transfer systems associated with risk exposures transferred to the first risk-transfer systems.

25. The OEM-linked, telematics-based system according to claim 24, wherein second risk transfer parameters and correlated second payment transfer parameters are generated via the central, expert-system based circuit of the second risk-transfer system, wherein an occurred loss is at least partly covered by the second insurance system based on the second risk transfer parameters and correlated second payment transfer parameters.

26. The OEM-linked, telematics-based system according to claim 25, wherein the first and second risk transfer parameters and the correlated first and second payment transfer parameters are dynamically adapted or optimized via the OEM-linked, telematics-based system based on the usage-based or user-based or operational automotive data captured from the motor vehicles, based on the risk-transfer profile selection of the user, and based on the pooled risks of the first risk transfer systems.

27. The OEM-linked, telematics-based system according to claim 1, wherein the transmitted telematics data at least include simultaneous measured, time-dependent contextual or environmental data of the motor vehicle including at least measured weather condition parameters or location coordinate parameters.

28. The OEM-linked, telematics-based system according to claim 1, wherein the OEM-linked, telematics-based system provides the risk exposure for one or a plurality of the pooled risk exposed motor vehicles based on the captured risk-related telematics data, wherein the first or second risk transfer parameters and the correlated first and second payment transfer parameters are dynamically generated based on the likelihood of the occurrence of the predefined risk events of the pooled driving motor vehicles.

29. The OEM-linked, telematics-based system according to claim 1, wherein occurred and triggered losses are automatically aggregated by captured loss parameters of the measured occurrence of risk events over all risk exposed motor vehicles within a predefined time period by incrementing an associated stored aggregated loss parameter and for automatically aggregating the received and stored first payment parameters overall risk exposed motor vehicles within the predefined time period by incrementing an associated stored, aggregated payment parameter, and wherein the variable first or second risk transfer parameters and the correlated first or second payment transfer parameters dynamically are generated based upon the ratio of the aggregated loss parameter and the aggregated payment parameter.

30. The OEM-linked, telematics-based system according to claim 1, wherein the first risk-transfer system includes an automated first resource pooling system and the second risk-transfer system includes an automated second resource pooling system, wherein the risk exposed motor vehicles are connected to the first resource pooling system via first risk-transfer system circuitry configured to receive and store first payments from the risk exposed motor vehicles for the pooling of their risk exposures, wherein the first risk-transfer system provides automated risk protection for each of the connected risk exposed motor vehicles based on received and stored first payment parameters, wherein the first risk-transfer system is connected to the second resource pooling system second risk-transfer system circuitry configured to receive and store second payment parameters from the first risk-transfer system for adopting of a portion of the risk exposures accumulated by the first risk-transfer system, and wherein, in the case of the occurrence of one of defined risk events the occurred loss is automatically covered by the automotive car system.

31. The OEM-linked, telematics-based system according to claim 1, wherein the central, expert-system based circuit includes additional triggers triggering accident notification or other added services based on the captured automotive data associated with the motor vehicles.

32. The OEM-linked, telematics-based system according to claim 1, wherein the vehicle embedded telematics devices (OEM line fitted) provides the one or more wireless connections via radio data systems devices or positioning system including a satellite receiving device or a mobile telephone interface including a digital radio service device or a language device in communication the radio data system or the positioning system or the cellular telephone interface.

33. The OEM-linked, telematics-based system according to claim 1 wherein the interfaces of the vehicle embedded telematics devices (OEM line fitted) for connection with at least one of a motor vehicle's data transmission bus include an interface for connection with a motor vehicle's Controller Area Network bus.

34. The OEM-linked, telematics-based system according to claim 1, wherein the vehicle embedded telematics devices (OEM line fitted) includes secured circuitry for saving processor-driving operation code and flash memory reading and capturing of the automotive data.

35. The OEM-linked, telematics-based system according to claim 1, wherein the vehicle embedded telematics devices (OEM line fitted) are connected to an in-car interactive device, wherein the vehicle's speed and travel distances is monitored by a global positioning system circuit and wherein the automotive data are transmitted via the vehicle embedded telematics devices (OEM line fitted) to the central, expert-system based circuit via a cellular telecommunication connection.

36. The OEM-linked, telematics-based system according to claim 1, wherein, in response to the emitted shadow request, individualized risk-transfer profiles based upon the dynamically collected single or compound set of variable scoring parameters are transmitted from at least one first risk-transfer system to a corresponding motor vehicle and issued by a mobile application of a mobile radio device or a mobile phone of the driver for selection by the driver of the motor vehicles, wherein said mobile application is associated with the OEM of the OEM-linked, telematics-based system.

\* \* \* \* \*